United States Patent
Nishimura et al.

(10) Patent No.: US 8,325,576 B2
(45) Date of Patent: Dec. 4, 2012

(54) OPTICAL DISC, OPTICAL DISC RECORDING APPARATUS, OPTICAL DISC REPRODUCING APPARATUS, INFORMATION RECORDING METHOD, INFORMATION REPRODUCING METHOD, AND INFORMATION RECORDING-REPRODUCING METHOD

(75) Inventors: Koichiro Nishimura, Yokohama (JP); Akio Fukushima, Yokohama (JP); Motoyuki Suzuki, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 219 days.

(21) Appl. No.: 12/608,108

(22) Filed: Oct. 29, 2009

(65) Prior Publication Data

US 2010/0226238 A1 Sep. 9, 2010

(30) Foreign Application Priority Data

Mar. 5, 2009 (JP) ................. 2009-051472

(51) Int. Cl.
*G11B 20/18* (2006.01)
(52) U.S. Cl. ............... 369/53.22; 369/47.27; 369/59.23; 369/59.25
(58) Field of Classification Search .............. 369/47.27, 369/53.22, 59.23, 59.25, 94, 275.3
See application file for complete search history.

(56) References Cited

U.S. PATENT DOCUMENTS

| 5,737,287 A | 4/1998 | Lee |
| 5,903,531 A | 5/1999 | Satoh et al. |
| 7,230,894 B2 * | 6/2007 | Shim .................... 369/47.27 |
| 2004/0013074 A1 | 1/2004 | Lee et al. |
| 2004/0228244 A1 | 11/2004 | Kim et al. |
| 2007/0002699 A1 | 1/2007 | Suh |
| 2007/0019533 A1 | 1/2007 | Ogawa et al. |
| 2007/0253306 A1 | 11/2007 | Takahashi et al. |
| 2007/0263500 A1 | 11/2007 | Nakahara et al. |
| 2008/0056097 A1 | 3/2008 | Nakahara et al. |
| 2008/0130444 A1 | 6/2008 | Kikukawa et al. |
| 2008/0279085 A1 | 11/2008 | Yashima et al. |
| 2009/0175151 A1 | 7/2009 | Miyashita et al. |
| 2009/0180375 A1 * | 7/2009 | Miyashita et al. ........... 369/283 |
| 2009/0245064 A1 * | 10/2009 | Heemskerk .................. 369/94 |

FOREIGN PATENT DOCUMENTS

| EP | 2 048 662 | 4/2009 |
| EP | 2 346 039 | 7/2011 |
| JP | 9-282785 | 10/1997 |
| JP | 2001-006293 | 1/2001 |
| JP | 2004-146066 | 5/2004 |
| JP | 2005-528726 | 9/2005 |
| JP | 2006-31907 | 2/2006 |
| JP | 2006-519456 | 8/2006 |

(Continued)

*Primary Examiner* — Wayne Young
*Assistant Examiner* — Brenda Bernardi
(74) *Attorney, Agent, or Firm* — Antonelli, Terry, Stout & Kraus, LLP.

(57) ABSTRACT

A configuration for reading out disc management information easily without errors from a disc in which recording is conducted with data recording densities of a plurality of kinds. An optical disc includes a plurality of data recording areas in which information is recorded with data recording densities which are different from each other. Information of the data recording densities in the data recording areas is recorded in a management information recording area (a BCA area or a PIC area) by using a unique format which does not depend upon the data recording densities of the data recording areas. The divided data recording areas are disposed in the same plane of the disc, or disposed over a plurality of recording layers.

20 Claims, 15 Drawing Sheets

BCA: Burst Cutting Area
PIC: Permanent Information & Control data

FOREIGN PATENT DOCUMENTS

| | | |
|---|---|---|
| JP | 2007-26617 | 2/2007 |
| JP | 2008-140444 | 6/2008 |
| JP | 2009-523101 | 6/2009 |
| WO | WO 2006/038633 | 4/2006 |
| WO | WO 2007/004822 | 1/2007 |
| WO | WO 2008/016008 | 2/2008 |
| WO | WO 2009/066470 | 5/2009 |

* cited by examiner

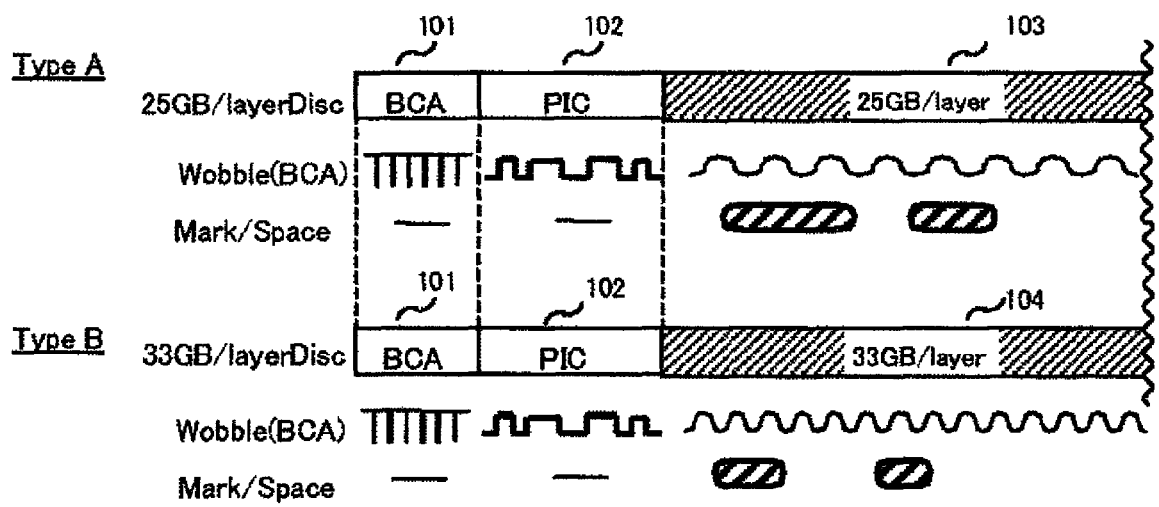

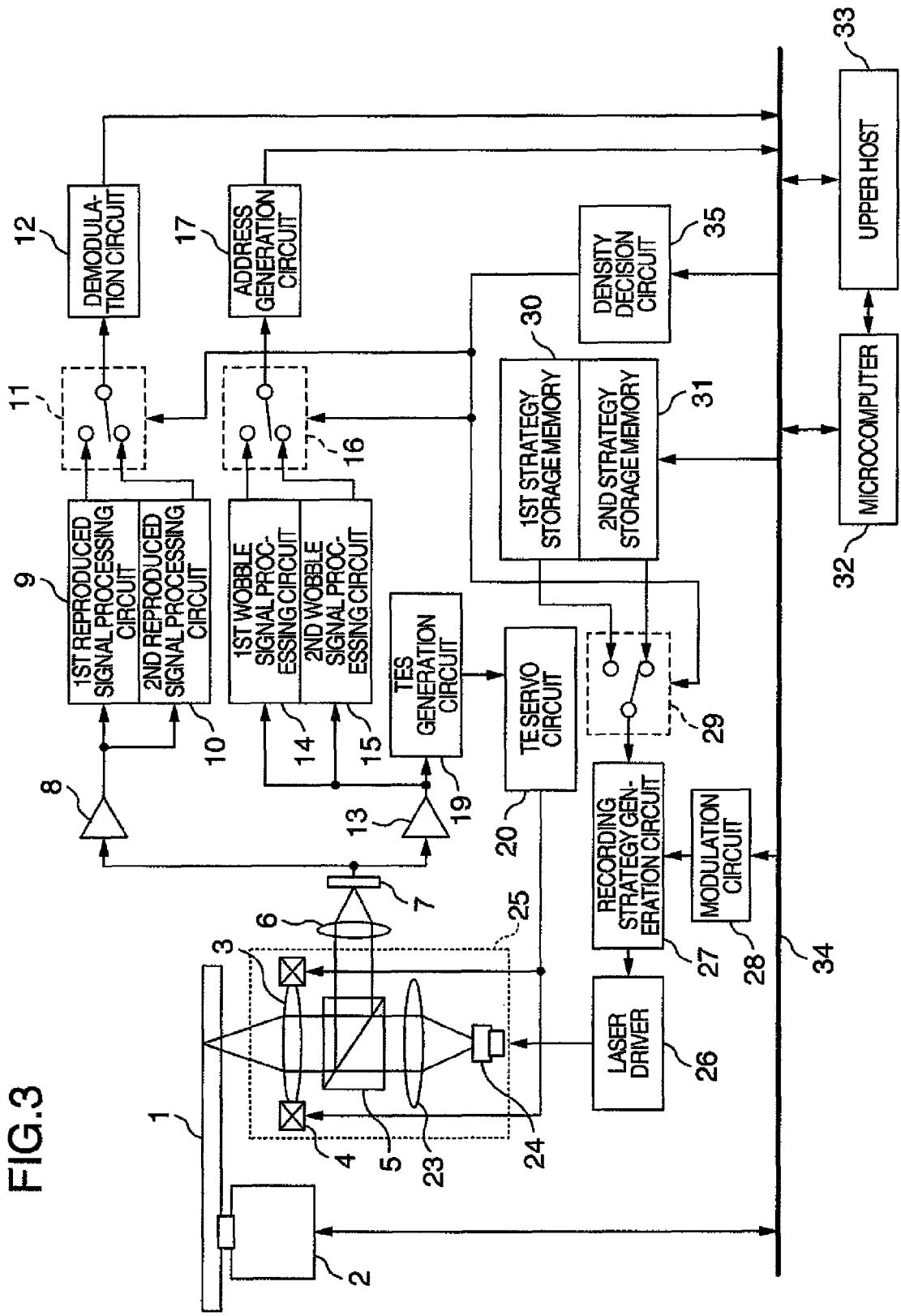

Type C
FIG.6A
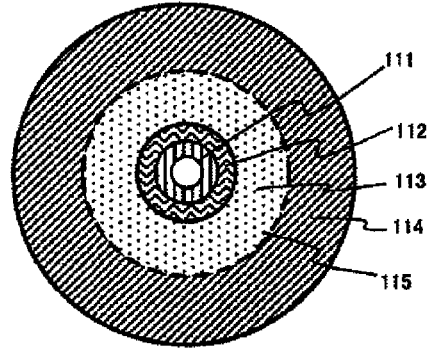
FIG.6B
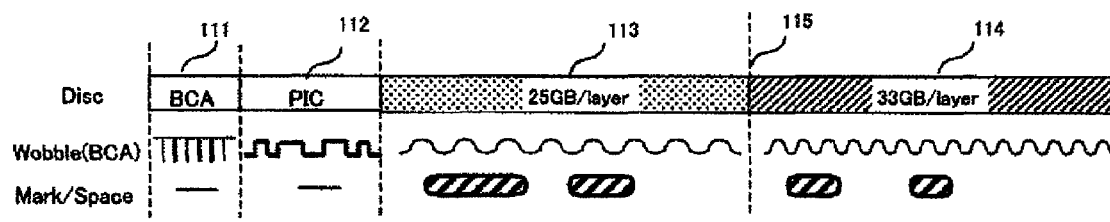
FIG.7
| | bit7 to 4 | bit3 | bit2 to 0 | |
|---|---|---|---|---|
| | Reserve | Hybrid | Density | |
| BP0 | 0000b | 0b | 000b | All area 25GB/layer density disc |
| | | | 001b | All area 33GB/layer density disc |
| | | | 010b to 111b | Reserved (all to 0b) |
| | | 1b | 000b | Hybrid Disc of 25GB/layer density and 33GB/layer density |
| | | | 001b to 111b | Reserved (all to 0b) |
| BP1 to 4 | Boundary Address of Differential density area | | | |

Type D

| | bit7 to 6 | bit5 to 4 | bit3 to 2 | bit1 to 0 |
|---|---|---|---|---|
| BP18 | Layer 3 density | Layer 2 density | Layer 1 density | Layer 0 density |
| BP19 | Layer 7 density | Layer 6 density | Layer 5 density | Layer 4 density | bit assign　00b ... 25GB/layer
　　　　　　01b ... 33GB/layer
　　　　　　10b, 11b ... Reserved

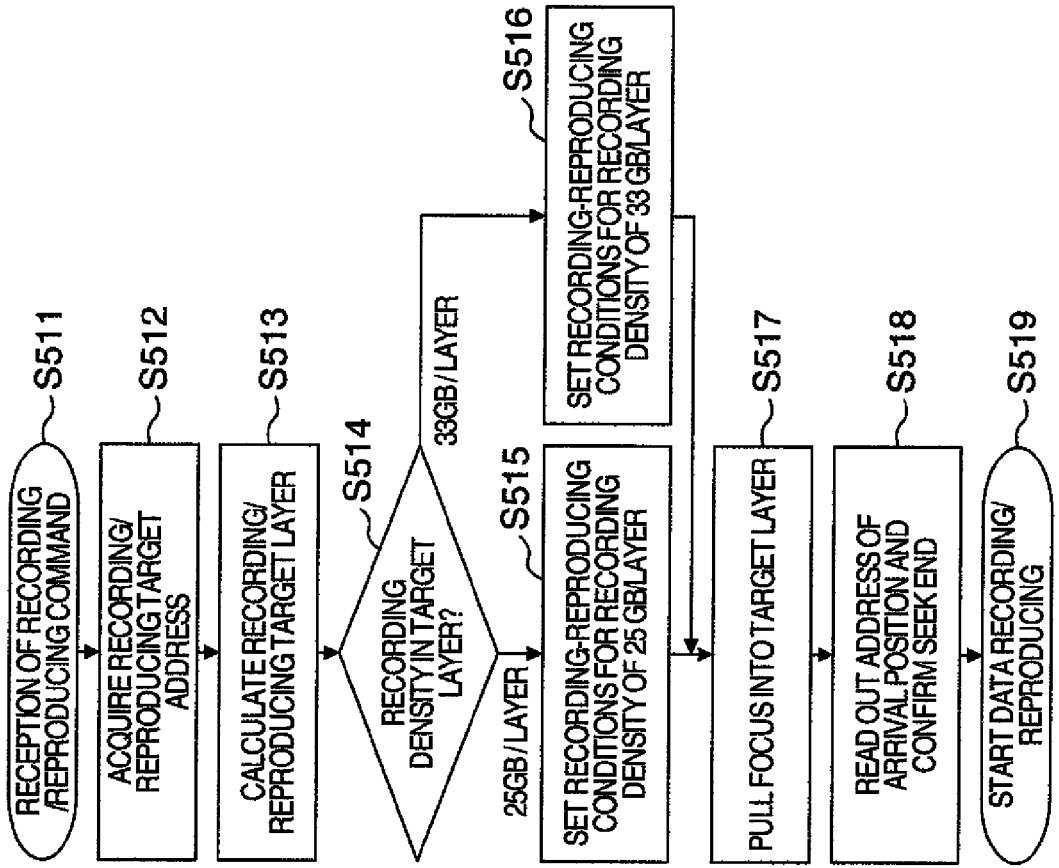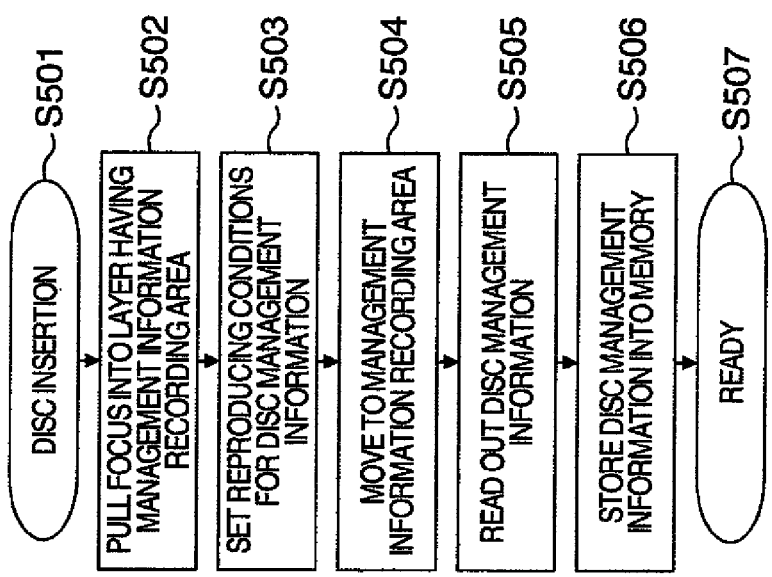

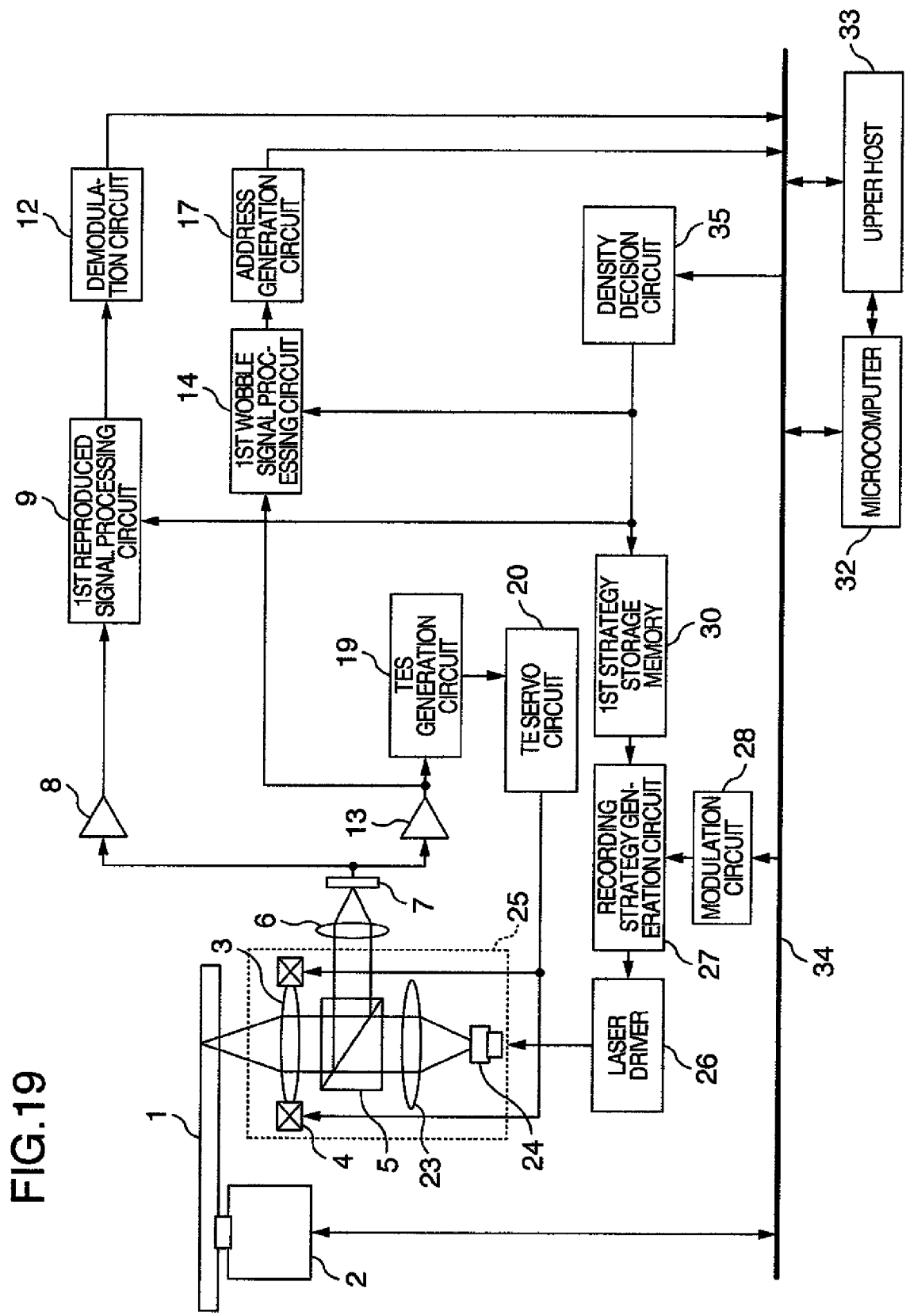

OPTICAL DISC, OPTICAL DISC RECORDING APPARATUS, OPTICAL DISC REPRODUCING APPARATUS, INFORMATION RECORDING METHOD, INFORMATION REPRODUCING METHOD, AND INFORMATION RECORDING-REPRODUCING METHOD

INCORPORATION BY REFERENCE

The present application claims priority from Japanese application JP2009-051472 filed on Mar. 5, 2009, the content of which is hereby incorporated by reference into this application.

BACKGROUND OF THE INVENTION

The present invention relates to an optical disc for recording information with data recording densities of a plurality of kinds, an optical disk recording-reproducing apparatus and an information recording-reproducing method.

In optical discs capable of recording a large capacity with a high density, a further increase in capacity is being promoted by increasing the number of recording layers. For example, in the Blu-ray discs (BD), approaches such as use of four layers each having a standard data recording density 25 GB/layer and use of three layers each having a higher density 33 GB/layer are made in order to record information of 100 GB on one sheet of disc. When optical discs which differ in recording format including the data recording density thus appear, an optical disc apparatus which discriminates the recording format and conducts recording and reproducing so as to correspond to the recording format becomes necessary.

As a technique relating to this, a configuration which changes over an optical system (numerical aperture NA) according to the kind of the disc and changes characteristics of the signal processing system so as to be linked to the changeover is disclosed in, for example, JP-A-09-282785. A structure which records format information of a plurality of recording layers in a read-in area in order to identify the format of respective recording layers in the case where one sheet of disc has a plurality of recording layers recorded using different formats is disclosed in JP-A-2007-26617.

SUMMARY OF THE INVENTION

In the case of the BD multi-layer disc, data recording densities of two kinds, i.e., the conventional standard density (25 GB/layer) and the higher density (33 GB/layer) are candidates as described above. In this case, a blue laser having a wavelength of 405 nm and a numerical aperture (NA) of 0.85 are used in both formats. Therefore, the format discrimination depending upon the reflectance at the disc surface or the like becomes difficult. As a result, it is not possible to discriminate the disc and conduct reproduction by using the technique described in JP-A-09-282785.

According to JP-A-2007-26617, format information of respective layers is recorded in a read-in area (system/data read-in area) or a BCA (Burst Cutting Area) in order to discriminate a multi-layer disc having a mixture of formats of two kinds (HD_DVD and DVD). However, troubles are caused in the following points.

(1) In the case of the read-in area, format information itself is recorded depending on a format of a layer to which the read-in area belongs. For reading out information from the read-in area, its format must be already known. If correspondence between layers and formats is not predetermined, however, it is expected that readout of information from the read-in area will fail.

(2) If an area (disc management information area) where the format information is recorded is an area where recording is conducted with the high density format, then readout becomes impossible and discrimination of the disc is impossible in an apparatus corresponding only to the conventional standard density (=the lower density).

(3) In the case of the multi-layer disc, it is desirable to manage recording possible/impossible information of each layer together with the format of the layer. In that case, it becomes necessary that format information can be recorded after manufacture of the disc. The read-in area and the BCA described in JP-A-2007-26617 are generated when the disc is manufactured, and they cannot be recorded after the manufacture.

For a disc on which recording is conducted with data recording densities of a plurality of kinds, an object of the present invention is to provide an optical disc from which disc management information can be read out easily without errors, its optical disc recording-reproducing apparatus, and its information recording-reproducing method.

In accordance with one aspect of the present invention, an optical disc for recording information with a predetermined recording density includes a data recording area for recording information therein, and a management information recording area for recording disc management information which includes information of a data recording density in the data recording area therein, and the disc management information is recorded in the management information recording area with a unique format which does not depend upon the data recording density in the data recording area.

In accordance with another aspect of the present invention, an optical disc in which information can be recorded with a plurality of recording densities includes a plurality of divided data recording areas disposed in same plane to record information therein with data recording densities which are different from each other, and a management information recording area for recording disc management information which includes data recording densities respectively in the data recording areas and information of boundary positions between the recording areas, and the disc management information is recorded in the management information recording area by using a unique format which does not depend upon the data recording densities respectively in the data recording areas.

In accordance with still another aspect of the present invention, an optical disc which has a plurality of recording layers and in which information can be recorded with a plurality of recording densities includes a plurality of data recording areas in which information is recorded with a data recording density which differs according to the layer, and a management information recording area for recording disc management information which includes information of data recording densities respectively in the data recording areas respectively of the recording layers, and the disc management information is recorded in the management information recording area by using a unique format which does not depend upon the data recording densities respectively in the data recording areas.

In accordance with still another aspect of the present invention, an optical disc which has a plurality of recording layers and in which information can be recorded with a plurality of recording densities includes a plurality of data recording areas in which information is recorded with a data recording density which differs according to the layer, and a management information recording area for recording disc management information which includes data recording densities respectively in the data recording areas, and the management information recording area is disposed in an area which is a part in a data recording area having a standard density as the data recording density and included in the data recording areas, and the disc management information is recorded with a format of the data recording density of the data recording area.

In accordance with still another aspect of the present invention, an optical disc has a management information recording area in which disc management information including information of data recording densities of data recording areas is recorded by using a unique format which does not depend upon the data recording densities of the data recording areas, and an optical disc recording-reproducing apparatus for recording or reproducing information into or from the data recording areas of the optical disc includes a spindle motor for rotating the optical disc, an optical head for reading out the disc management information from the management information recording area of the optical disc and recording or reproducing information into or from the data recording areas of the optical disc, a recording-reproducing processing unit for conducting processing on a recording signal to be supplied to the optical head or a reproduced signal supplied from the optical head, and a recording density decision circuit for making a decision regarding a data recording density of a target data recording area or information having an indirect relation to the data recording density on the basis of the disc management information read out by the optical head. On the basis of the data recording density obtained as a result of the decision made by the recording density decision circuit, the recording-reproducing processing unit selects and sets recording-reproducing processing conditions or stops the ensuing operation by using a suitable method. For example, if the number of disc layers corresponds to a data recording density in one-to-one correspondence, then operation for selecting the recording-reproducing conditions or stopping the ensuing operation by using a suitable method is conducted on the basis of the number of disc layers. As another example, there is a case where the recording capacity of the disc also becomes information relating to the data recording density. In that case, operation for selecting the recording-reproducing conditions or stopping the ensuing operation by using a suitable method is conducted on the basis of the recording capacity of the disc.

In accordance with still another aspect of the present invention, an optical disc has a management information recording area in which disc management information including information of data recording densities of data recording areas is recorded by using a unique format which does not depend upon the data recording densities of the data recording areas, and an optical disc recording-reproducing method for recording or reproducing information into or from the data recording areas of the optical disc includes the steps of setting reproducing conditions for reproducing the disc management information in accordance with the unique format, reading out the disc management information from the management information recording area in the optical disc, making a decision as to a data recording density of a data recording area or information having an indirect relation to the data recording density on the basis of the disc management information read out, selecting and setting recording-reproducing processing conditions according to the data recording density obtained as a result of the decision, and recording or reproducing information under the set recording-reproducing processing conditions or stopping ensuing operation by using a suitable method.

In an information recording-reproducing method for recording or reproducing information into or from a data recording area of an optical disc according to still another aspect of the present invention, disc management information including information of data recording densities of data recording areas is recorded in a management information recording area of the optical disc by using a unique format which does not depend upon the data recording densities of data recording areas. When the disc is attached to an existing drive which does not correspond to recording and reproducing of the disc, therefore, the disc management information provides means which makes it possible for the existing drive to acquire disc discrimination information required for the existing drive to conduct proper processing (such as, for example, stopping the function safely or ejecting the disc).

According to the present invention, it becomes possible to conduct suitable reproducing operation and recording operation and improve the convenience for users.

Other objects, features and advantages of the invention will become apparent from the following description of the embodiments of the invention taken in conjunction with the accompanying drawings.

BRIEF DESCRIPTION OF THE DRAWINGS

FIG. 1 is a diagram showing an example of a recording layout of an optical disc (type A and type B) in a first embodiment;

FIG. 2 is a diagram showing an inscription example of disc management information in the disc in the first embodiment;

FIG. 3 is a diagram showing a configuration example of an optical disc recording-reproducing apparatus in the first embodiment;

FIGS. 6A and 6B are diagrams showing an example of a recording layout of an optical disc (type C) in a second embodiment;

FIG. 7 is a diagram showing an inscription example of disc management information in the disc in the second embodiment;

FIGS. 14A and 14B are flow charts showing a procedure of recording-reproducing processing in the third embodiment;

FIG. 19 is a diagram showing a configuration example of an optical disc recording-reproducing apparatus in the fifth embodiment.

DETAILED DESCRIPTION OF THE EMBODIMENTS

Figure 4:
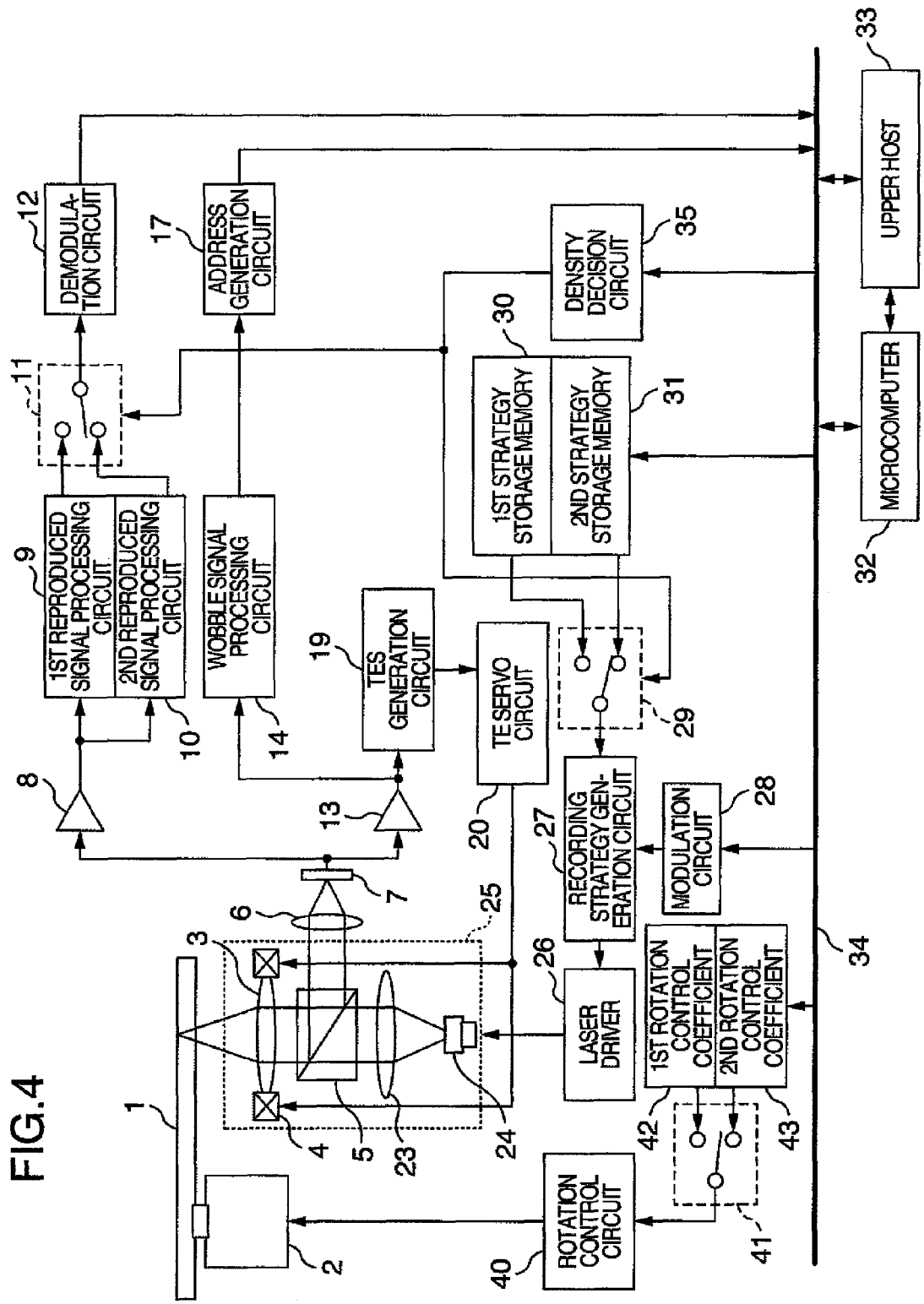
FIG. 4 is a diagram showing another configuration example of the optical disc recording-reproducing apparatus in the first embodiment.

Hereafter, embodiments of the present invention will be described with reference to the drawings.

First Embodiment

The present embodiment is intended for a multi-layer blu-ray disc (BD) including a disc (hereafter referred to as type A) which has the standard density (25 GB/layer) as the data recording density in every layer and a disc (hereafter referred to as type B) which has the higher standard density (33 GB/layer) as the data recording density in every layer. As for the number of layers, for example, the disc of the type A has a configuration of 25 GB/layer×4 layers and the disc of the type B has a configuration of 33 GB/layer×3 layers. In this way, the capacity of the whole disc is 100 GB in both the disc of the type A and the disc of the type B. However, the recording capacity per layer, the number of layers per disc and the total recording capacity per disc are nothing but an example, and they are not restrictive. Herein, the difference in data recording density is described by converting it to that in the recording capacity per layer in a user data area. This is done for convenience of description. How to discriminate the disc of the type A and the disc of the type B and how to process the disc of the type A and the disc of the type B in a recording-reproducing apparatus will now be described.

TABLE 1 shows primary parameters of recording formats in the disc of the type A and in the disc of the type B in a comparative form. By the way, the linear velocity is supposed to be 4.917 m/s, which is the standard velocity of the type A. The disc of the type A (25 GB/layer) has a shortest mark length=0.149 µm and a track pitch=0.32 µm, whereas the disc of the type B (33 GB/layer) has a shortest mark length=0.113 µm and a track pitch=0.32 µm. The disc of the type A and the disc of the type B are made the same in disc format such as the modulation rule of the recording information signal, data and addressing in the discs, and wobbles synchronized to them. In the present description, it is supposed that the linear velocity in the disc of the type A is the same as that in the disc of the type B. Since the data recording density in the line direction in the disc of the type B is higher than that in the disc of the type A, the disc of the type A differs from the disc of the type B in channel clock frequency and in wobble frequency. At the time of recording-reproducing, therefore, it is necessary to change over the processing condition according to changes in them. In other words, reproduced signal level processing is changed over according to the shortest mark length, conditions of the reproduction equalizer and recording strategy are changed over according to the clock frequency, and the address reproducing condition is changed over according to the wobble frequency.

TABLE 1

|  | 25 GB/layer | 33 GB/layer | Related matter |
|---|---|---|---|
| Minimum mark length [µm] | 0.149 | 0.113 | Signal characteristic |
| Channel clock frequency [MHz] | 66 | 87.1 | Read Condition (EQ etc) Write Contidion (Strategy etc) |
| Wobble frequency [kHz] | 956.5 | 1262.6 | Address reproduction |

FIG. 1 is a diagram showing an example of recording layouts in the optical discs (type A and type B).

In the disc of the type A and the disc of the type B, a BCA (Burst Cutting Area) area 101, a PIC (Permanent Information & Control data) area 102, and a data recording area 103 or 104 are disposed from the disc inner circumference side. In the BCA area 101, information is described by using a bar code having a width in the range of 4 to 17 µm at intervals of 28.6 µm on the center side of the discs. The BCA area 101 has a recording density which is independent of that in the data recording area. The information is recorded by burning off a reflection film with a strong infrared ray laser called YAG laser after manufacture of the discs. The BCA area is an area for describing information required by the maker after the manufacture of the disc. For example, a serial ID for identifying each disc, and encryption information are recorded in the BCA area.

The PIC area 102 is a management information area in the BD. The PIC area 102 is an area in which management information is superimposed on the wobble of the track with a change of the wobble frequency. The wobble frequency is defined as an integer times the channel clock frequency, and high frequency grooves (HFM grooves) are formed with the wobble frequency. Since data information recording using pits and marks according to the disc format is not conducted in the area of the HFM grooves, the wobble frequency can be set independently of the recording density in the data area. They are formed in the same way as the wobbles (grooves) in the data area by a stamper or the like at the time of the manufacture of the discs, and a predetermined value, for example, laser power value required for recording/reproducing is described at the time of the manufacture of the discs. Information (data) is recorded on the data recording areas 103 and 104 with the recording densities 25 GB/layer and 33 GB/layer, respectively.

In the present embodiment, disc management information such as the data recording densities of the data recording areas 103 and 104 is recorded in the BCA area 101 or the PIC area 102 at the time of manufacture of the discs. In both the disc of the type A and the disc of the type B, the BCA area 101 and the PIC area 102 have a unique format different from that in the data storage area and the unique format is the same in the type A and type B. The disc management information is recorded with a specific recording density which conforms to the inherent format. In other words, the recording density with which the disc management information is described is caused to be independent of the data recording density in the data recording areas 103 and 104 in the discs.

FIG. 2 is a table showing an inscription example of disc management information (data recording density information) in the disc of the type A and the disc of the type B. An example of bit arrangement to be used when describing the data recording density information or information relating to the data recording density (for example, the recording capacity per layer) is shown in FIG. 2.

In the ensuing description, the data recording density information or information relating to the data recording density (for example, the recording capacity per layer) is referred to simply as density information, and described as for example, 25 GB/layer.

Herein, the recording density (type A) corresponding to 25 GB/layer is defined as "0000" in bit description whereas the recording density (type A) corresponding to 33 GB/layer is defined as "0001" in bit description. The recording density of the disc or the information relating to the data recording density can be distinguished by discriminating the bit value.

FIG. 3 is a diagram showing a configuration example of an optical disc recording-reproducing apparatus in the present embodiment.

Principal components will now be described. Reference numeral 1 denotes an optical disc (which is here the BD shown in FIG. 1), 2 a spindle motor which rotates the optical disc, and 25 an optical head. The optical head 25 irradiates the optical disc 1 with laser light (blue laser light having a wavelength in the vicinity of 405 nm), and reads out the disc management information. In addition, the optical head 25 conducts information recording/reproducing on the data recording areas 103 and 104 of the optical disc 1. In order to cope with a plurality of data recording densities, a density decision circuit 35, first and second reproduced signal processing circuits 9 and 10, first and second wobble signal processing circuits 14 and 15, and first and second strategy storage memories 30 and 31 are included. A microcomputer 32 controls readout of the disc management information, setting for the recording-reproducing circuit, execution of the recording-reproducing operation, and so on.

In the present embodiment, the disc management information is read out from the BCA area 101 or the PIC area 102 in the optical disc, and the density decision circuit 35 discriminates the density information (whether it is 25 GB/layer or 33 GB/layer) of the object disc. Changeover between the first and second reproduced signal processing circuits 9 and 10 is conducted in accordance with the result of the discrimination, and a demodulation circuit 12 demodulates the reproduced signal. Furthermore, changeover between the first and second wobble signal processing circuits 14 and 15 is conducted, and an address generation circuit 17 reproduces a recording-reproducing address. Changeover between the first and second strategy storage memories 30 and 31 is conducted, and a recording strategy generation circuit 27 generates a recording signal. In the changeover between the reproduced signal processing circuits 9 and 10, setting of a reproducing equalizer conformed to the shortest mark length and the clock frequency is conducted. In the changeover between the wobble signal processing circuits 14 and 15, setting of address reproduction conformed to the wobble frequency is conducted. In the changeover between the strategy storage memories 30 and 31, setting of a recording strategy conformed to the clock frequency is conducted.

FIG. 4 is a diagram showing another configuration example of the optical disc recording-reproducing apparatus. As compared with the configuration shown in FIG. 3, a rotation control circuit 40 which controls the rotation of the spindle motor 2, and first and second circuit control coefficient storage memories 42 and 43 are provided, and the first and second wobble signal processing circuits 14 and 15 shown in FIG. 3 are integrated into the wobble signal processing circuit 14. The density decision circuit 35 makes a decision as to the density information (whether it is 25 GB/layer or 33 GB/layer) of the object disc, and conducts changeover between the first and second circuit control coefficient storage memories 42 and 43. As a result, it is possible to change the number of revolutions of the disc according to the density, and make the reproduced wobble frequency constant.

Figure 5:
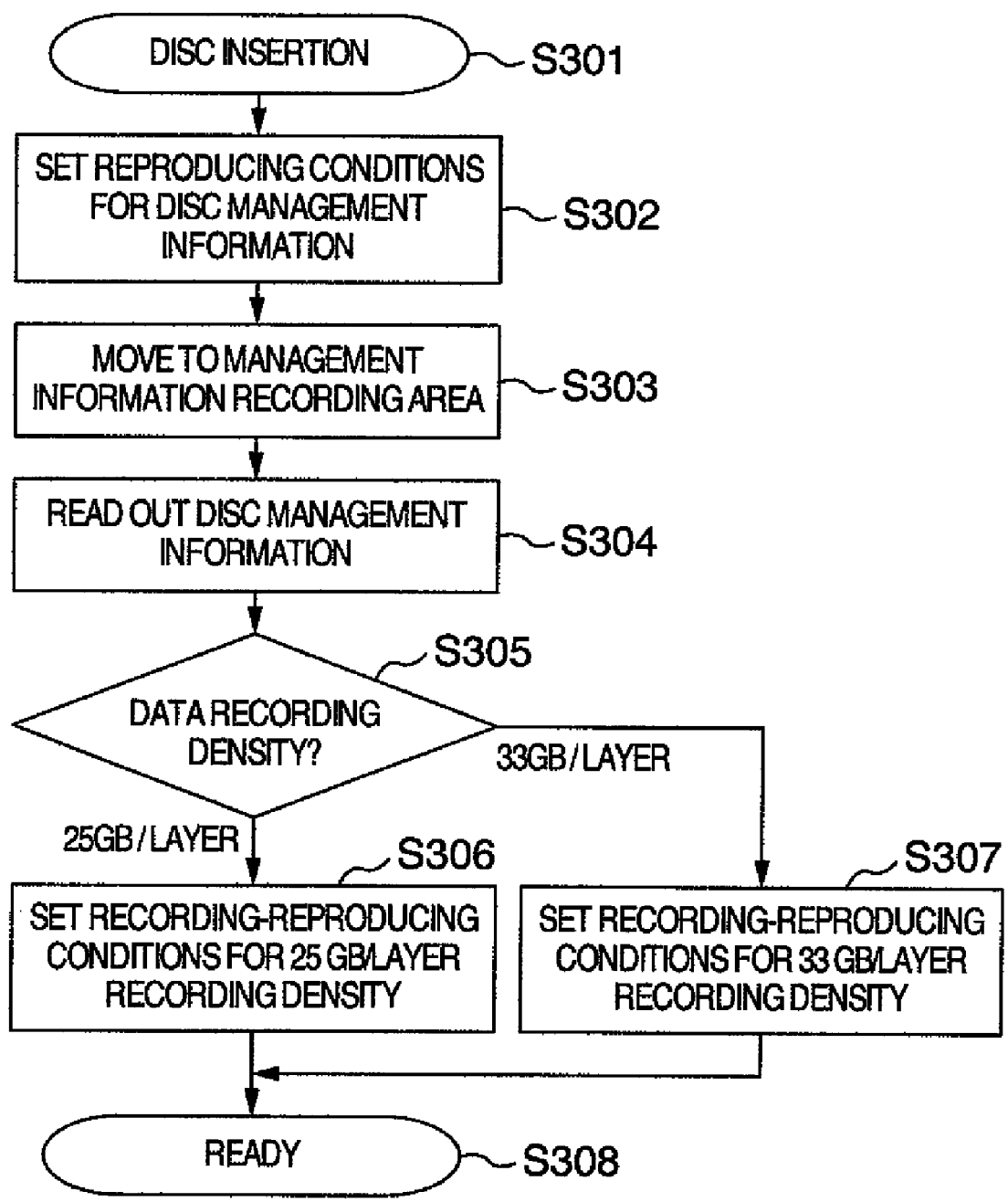
FIG. 5 is a flow chart showing a procedure of recording-reproducing processing in the first embodiment.

FIG. 5 is a flow chart showing a procedure of recording-reproducing processing in the present embodiment.

At S301, a disc is inserted into the optical disc apparatus. Here, the disc has a recording density of 25 GB/layer (type A) or 33 GB/layer (type B).

At S302, reproducing conditions for reading out the disc management information (data recording density information) from the disc are set. In other words, reproducing conditions conforming to the format of the BCA area 101 or the PIC area 102 are set.

At S303, the optical head is moved to the management information recording area (the BCA area or the PIC area) on the head.

At S304, the disc management information is read out from the management information recording area.

At S305, a decision is made whether the disc has a recording density of 25 GB/layer (type A) or a recording density of 33 GB/layer (type B) on the basis of the recording density information thus read out.

In the case of 25 dB/layer (type A), the processing proceeds to S306 and recording-reproducing processing conditions (the reproduced signal processing circuit, the wobble signal processing circuit and the recording strategy) for 25 GB/layer are set.

In the case of 33 dB/layer (type B), the processing proceeds to S307 and recording-reproducing processing conditions (the reproduced signal processing circuit, the wobble signal processing circuit and the recording strategy) for 33 GB/layer are set.

At S308, a command for ordering information recording or reproducing given by the host is waited for. Upon being given the order, recording/reproducing operation is executed under the conditions set at S306 or S307.

In the present embodiment, the disc management information is already recorded in the BCA area or the PIC area by using a unique format. Therefore, the reproducing conditions for the management information are determined uniquely. No matter which of the recording densities the inserted disc has, therefore, the reproducing conditions for the management information are the same. As a result, it is possible to make a decision as to the recording density of the disc easily without errors, and execute recording-reproducing operation which conforms to the recording density.

Second Embodiment

The present embodiment is intended for a disc (hereafter referred to as type C) including a mixture of an area having the standard density (25 GB/layer) as the data recording density and an area having the higher density (33 GB/layer) as the data recording density in the same plane (in the same layer). As for the number of layers, it is now supposed for brevity that a single layer is used. However, the disc may be a multi-layer disc. Both a conventional apparatus corresponding to the standard density (25 GB/layer) and a higher density corresponding apparatus which corresponds to the higher density (33 GB/layer) can conduct recording and reproducing on an area of the disc of the type C to which the apparatus corresponds.

FIGS. 6A and 6B are diagrams showing an example of a recording format of the optical disc (type C). FIG. 6A shows a plane configuration, and FIG. 6B shows a configuration in the radial direction.

In the disc of the type C, a BCA area 111, a PIC area 112, a first recording density area (25 GB/layer) 113, and a second recording density area (33 GB/layer) 114 are disposed from the inner circumference side in the same plane in the cited order. Reference numeral 115 denotes a boundary between the first recording density area 113 and the second recording density area 114. This boundary part 115 may be provided with an unrecorded part (a gap area) having a predetermined width in the radial direction. The disc management information (data recording density information) is recorded in the BCA area 111 or the PIC area 112. Since the BCA area 111 and the PIC area 112 have a unique format different from that of the user data recording area, the disc management information is recorded with a specific recording density. In other words, the recording density of the disc management information does not depend upon the data recording density in the data recording areas 113 and 114 in the disc.

FIG. 7 is a diagram showing an inscription example of the disc management information (data recording density information) in the disc C. An example of a bit arrangement for describing the density information is shown. As for information contents, an item (Hybrid) which indicates whether a plurality of recording densities are mixedly present is added, and position information (address value) of the recording density boundary is described. If Hybrid="1", then it is indicated that the disc is a mixture disc (type C), and a plurality of density information values and a boundary address value are described. If Hybrid="0", it is indicated that the single recording density (type A or type B) is used. The type A, B and C can be discriminated on the basis of the inscription shown in FIG. 7.

Figure 8:
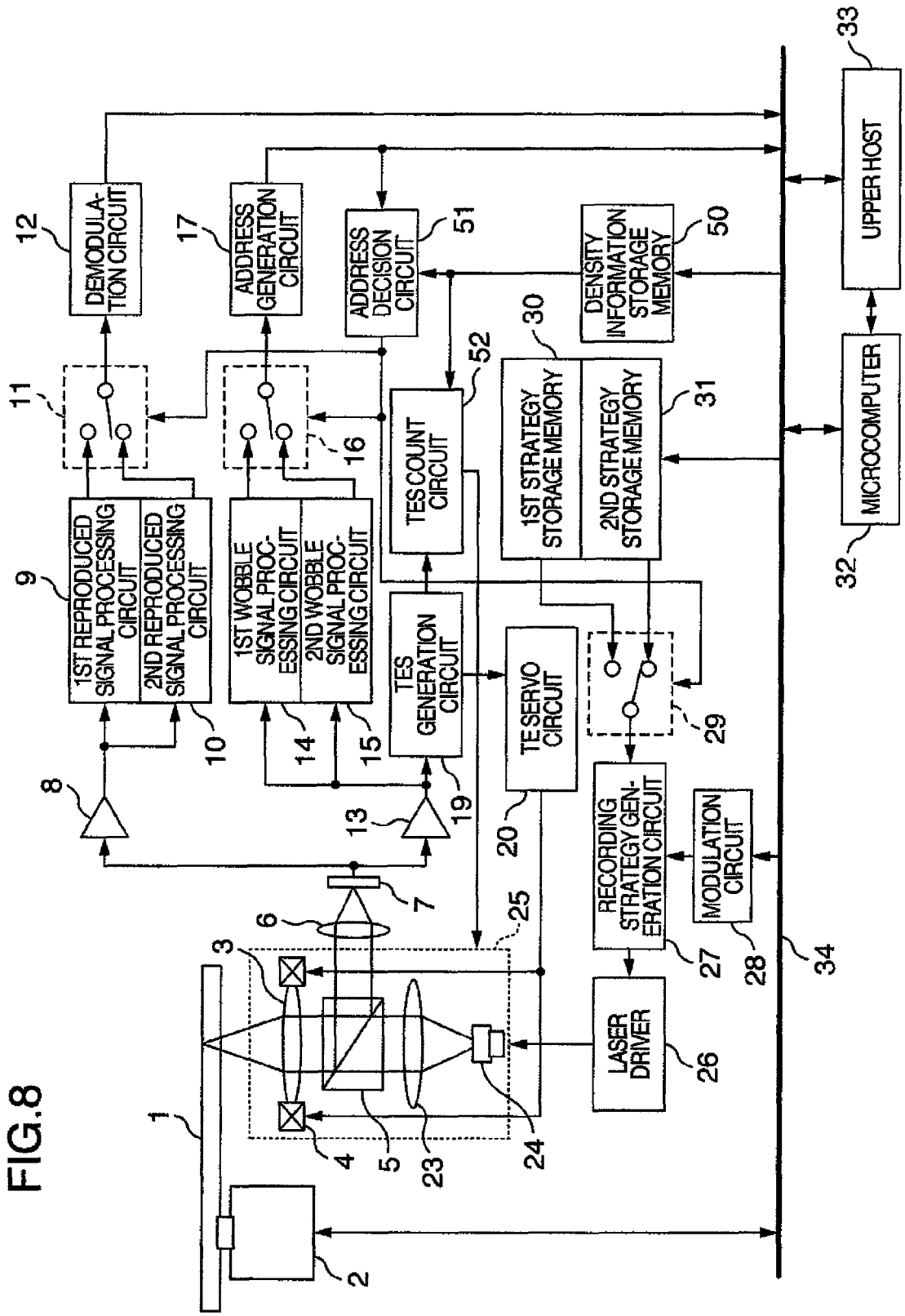
FIG. 8 is a diagram showing a configuration example of an optical disc recording-reproducing apparatus in the second embodiment.

FIG. 8 is a diagram showing a configuration example of an optical disc recording-reproducing apparatus in the present embodiment. In the present embodiment, a density information storage memory 50, an address decision circuit 51, and a track crossing number (TES) count circuit 52 are provided in the configuration shown in FIG. 3.

The density information and the boundary address information read out from the disc of the type C is stored in the density information storage memory 50, and they are referred to by the address decision circuit 51. The address decision circuit 51 receives current address information from the address generation circuit 17, and makes a decision as to the density in the object area (whether the recording density is 25 GB/layer or 33 GB/layer). On the basis of a result of the decision, the address decision circuit 51 conducts changeover between the first and second reproduced signal processing circuits 9 and 10, changeover between the first and second wobble signal processing circuits 14 and 15, and changeover between the first and second strategy storage memories 30 and 31. Furthermore, seek operation to a target area is conducted by calculating the number of track crossings as far as the target area (target address) and causing the TES count circuit 52 to count the number of tracks.

Figure 9:
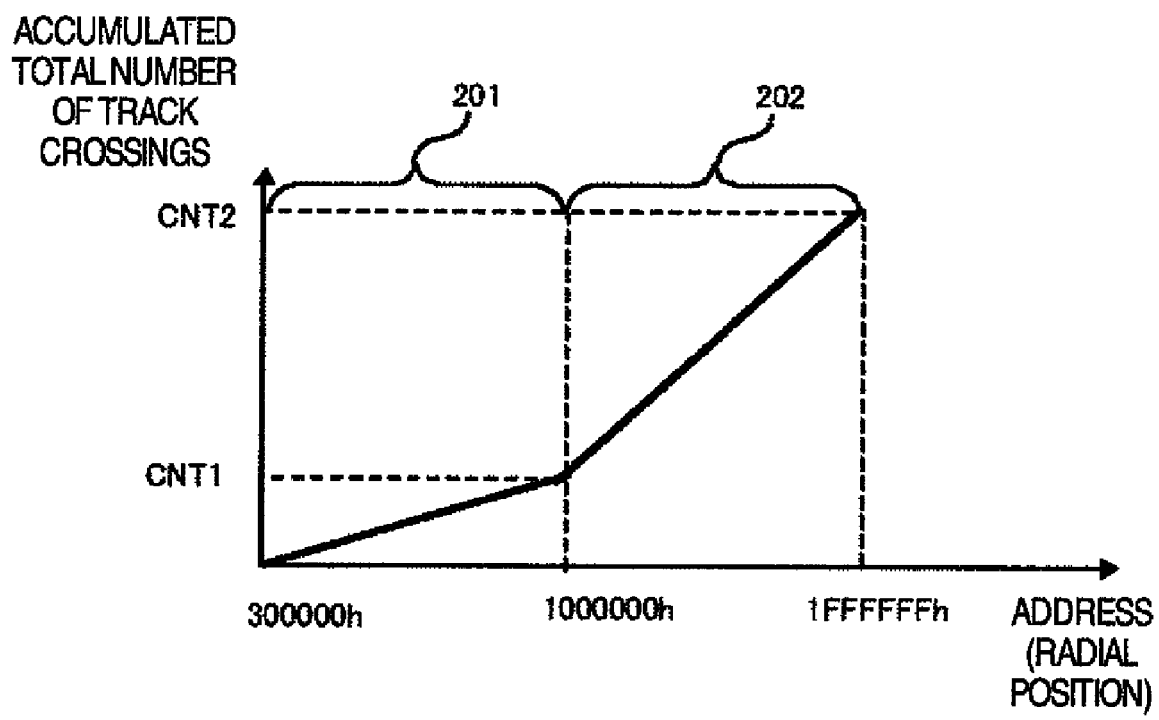
FIG. 9 is a diagram showing an address decision method based on the number of track crossings.

FIG. 9 is a diagram showing an address decision method based on the number of track crossings. The abscissa axis indicates the address value (radial position), and the ordinate axis indicates the accumulation value of the number of track crossings (TES) counted by the TES count circuit 52. A section 201 is an area of 25 GB/layer, and a section 202 is an area of 33 GB/layer. The boundary address is "1000000h." As the address becomes greater, the accumulated value of the TES number increases. However, the gradient depends upon the recording density, and the gradient in the section 201 differs from than in the section 202. Seek operation to the boundary address can be conducted by previously calculating the accumulation value CNT1 of the TES number at the boundary address "1000000h" and causing the TES count circuit 52 to count up to CNT1. In addition, the target area (address) can be arrived at by counting the number of track crossings from the boundary part.

Figure 10:
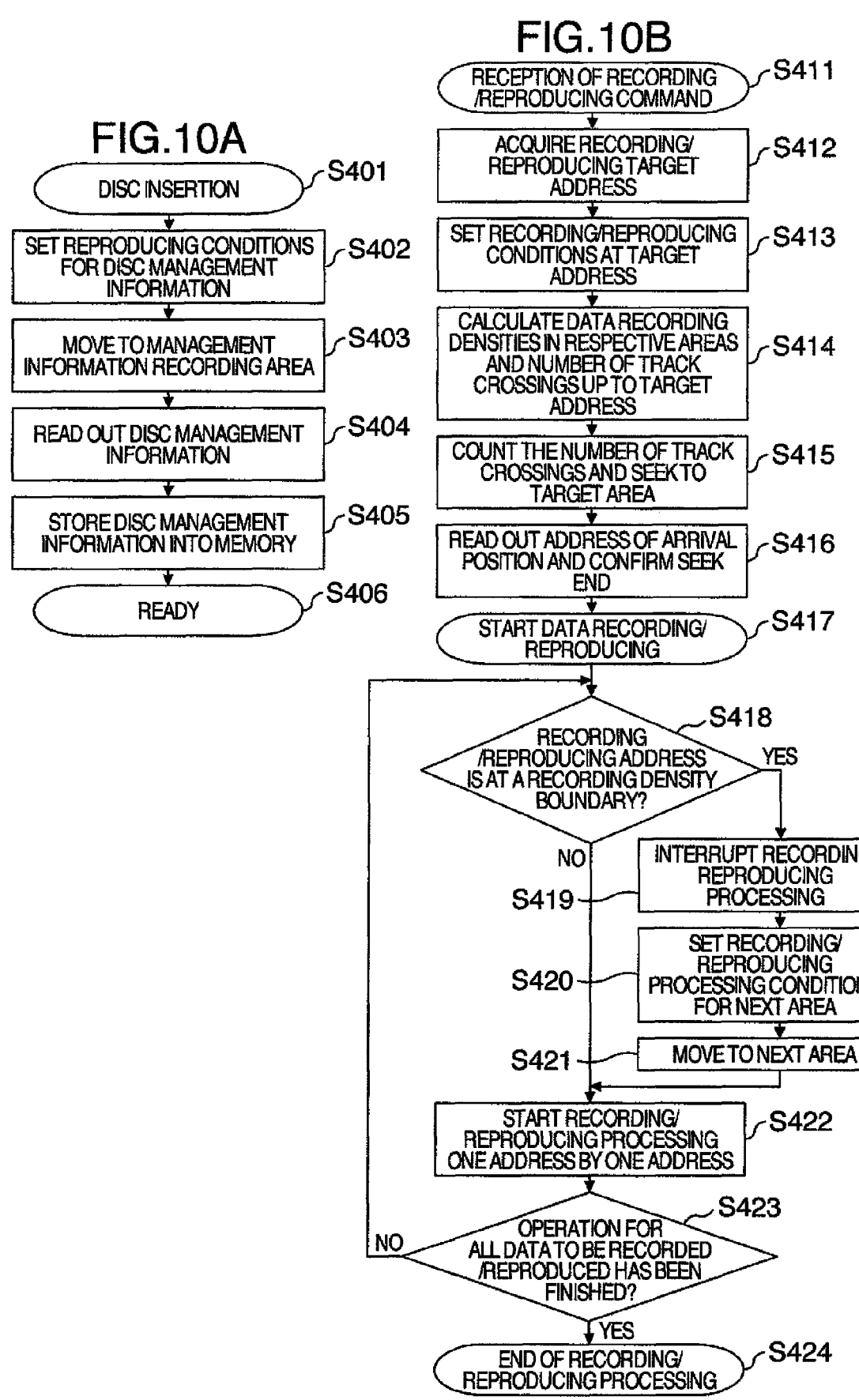
FIGS. 10A and 10B are flow charts showing a procedure of recording-reproducing processing in the second embodiment.

FIGS. 10A and 10B are flow charts showing a procedure of recording-reproducing processing in the present embodiment. FIG. 10A shows a process at the time of disc loading, and FIG. 10B shows a process at the time of recording-reproducing processing.

At S401, the disc is inserted into the optical disc apparatus. Here, the disc is a disc (type C) in which the area having the standard density (25 GB/layer) and the area having the higher density (33 GB/layer) are mixedly present in the same plane.

At S402, reproducing conditions for reading out the disc management information (data recording density information) from the disc are set. In other words, reproducing conditions conforming to the format of the BCA area 111 or the PIC area 112 are set.

At S403, the optical head is moved to the management information recording area (the BCA area 111 or the PIC area 112) in the disc.

At S404, the disc management information is read out from the management information recording area.

At S405, the disc management information (the data recording densities and the density boundary address value) read out from the management information recording area is stored in the density information storage memory 50.

At S406, a command for ordering information recording or reproducing given by the host is waited for.

Next, the processing proceeds to the recording-reproducing processing.

At S411, the command for information recording or reproducing is received from the host.

At S412, a target address of recording/reproducing is acquired from the received command.

At S413, recording/reproducing conditions at the target address are set on the basis of the target address and the disc management information (the data recording densities and the density boundary address value) stored in the density information storage memory 50. In other words, the recording-reproducing processing conditions (the reproduced signal processing circuit, the wobble signal processing circuit and the recording strategy) are set to the conditions for 25 GB/layer or conditions for 33 GB/layer.

At S414, the data recording densities in respective areas as far as the target address and the number of track crossings (TES) as far as the target address are calculated on the basis of the target address and the disc management information stored in the density information storage memory 50.

At S415, the number of track crossings is counted and seek operation to the target area is conducted.

At S416, the address of the arrival position is read out and the seek end is confirmed.

At S417, the data recording/reproducing operation is started.

At S418, a decision is made whether the recording/reproducing address is the boundary address of the recording density. If the recording/reproducing address is the boundary address, then the processing proceeds to S419. If the recording/reproducing address is not the boundary address, then the processing proceeds to S422.

At S419, the recording/reproducing operation is interrupted.

At S420, the recording density information of the next area is read out from the density information storage memory 50. Recording/reproducing processing conditions (the reproduced signal processing circuit, the wobble signal processing circuit, and the recording strategy) corresponding to the density are set.

At S421, movement to the next recording density area is conducted.

At S422, recording/reproducing processing is conducted by taking an address as the unit.

At S423, a decision is made whether operation for all data to be recorded/reproduced has been finished. If there is remaining data, then the processing returns to S418 to be continued. If there is no remaining data, then the recording-reproducing processing is finished at S424.

According to the present embodiment, the disc management information (arrangement of the recording densities and the boundary address) is recorded in the BCA area or the PIC area in accordance with the unique format, in the disc (type C) having a mixture of different recording densities in the same plane as well. Therefore, the reproducing conditions for the management information are determined uniquely, and the recording density can be discriminated easily without errors. And in accordance with a recording density at the target position in the disc, the recording-reproducing operation conformed to the recording density can be executed.

Third Embodiment

The present embodiment is intended for a multi-layer disc (hereafter referred to as type D) including a mixture of a layer having the standard density (25 GB/layer) as the data recording density and a layer having the higher density (33 GB/layer). Both a conventional apparatus corresponding to the standard density (25 GB/layer) and a higher density corresponding apparatus which corresponds to the higher density (33 GB/layer) can conduct recording and reproducing on a layer to which the apparatus corresponds.

Figures 11, 12:
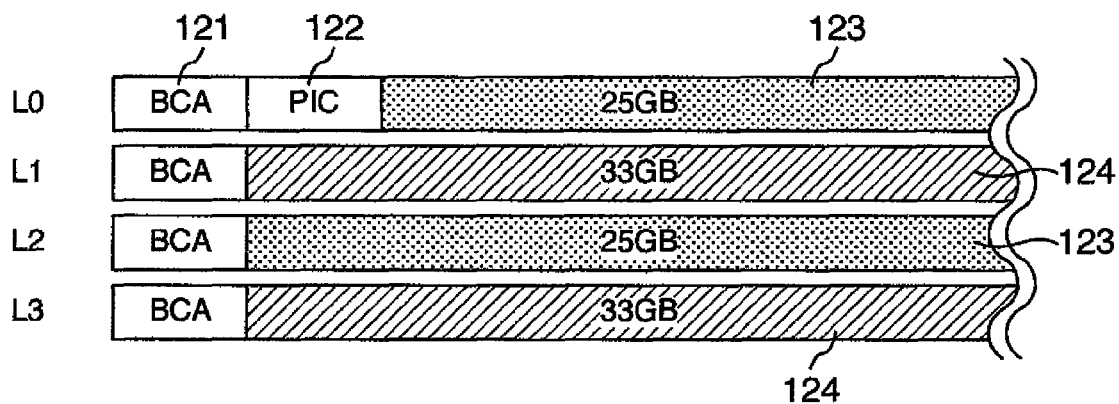
FIG. 11 is a diagram showing an example of a recording layout of an optical disc (type D) in a third embodiment.
FIG. 12 is a diagram showing an inscription example of disc management information in the disc in the third embodiment.

FIG. 11 is a diagram showing an example of a recording format in the optical disc (type D). The example has a four-layer configuration obtained by disposing layers of 25 GB/layer and layers of 33 GB/layer alternately. The recording layers are denoted by L0, L1, L2 and L3 in the cited order from the disc surface side. In each layer, a BCA area 121, a PIC area 122, data recording areas 123 and 124 are disposed in the cited order from the inner circumference side. In the data recording area 123 or 124 of each layer, data are recorded with a data recording density of 25 GB/layer or 33 GB/layer. Although the RCA area 121 exists in each area, the PIC area 122 is formed only in the L0 layer. In the present example, the disc management information (data recording density information) is recorded in the PIC area 122. Since the PIC area 122 has a unique format different from that of the user data recording area, the disc management information is recorded with a specific recording density. In other words, the recording density of the disc management information does not depend upon the data recording density in the adjacent data recording area 123. Setting always the recording density in the L0 layer including the PIC area 122 to the standard 25 GB/layer brings about an effect that compatibility with the conventional apparatus corresponding to the standard density (25 dB/layer) can be held. Or the PIC area 122 may be disposed in a recording layer in which the data recording density becomes the lowest.

FIG. 12 is a diagram showing an inscription example of the disc management information (data recording density information) in the disc D. An example of a bit arrangement for describing the density information is shown. As for information contents, a column for describing the recording density of each layer is provided and the data recording density is described by using two bits. Herein, columns corresponding to eight layers are provided, and the recording density 25 GB/layer is defined and described as bits "00" whereas the recording density 33 GB/layer is defined and described as bits "01".

Figure 13:
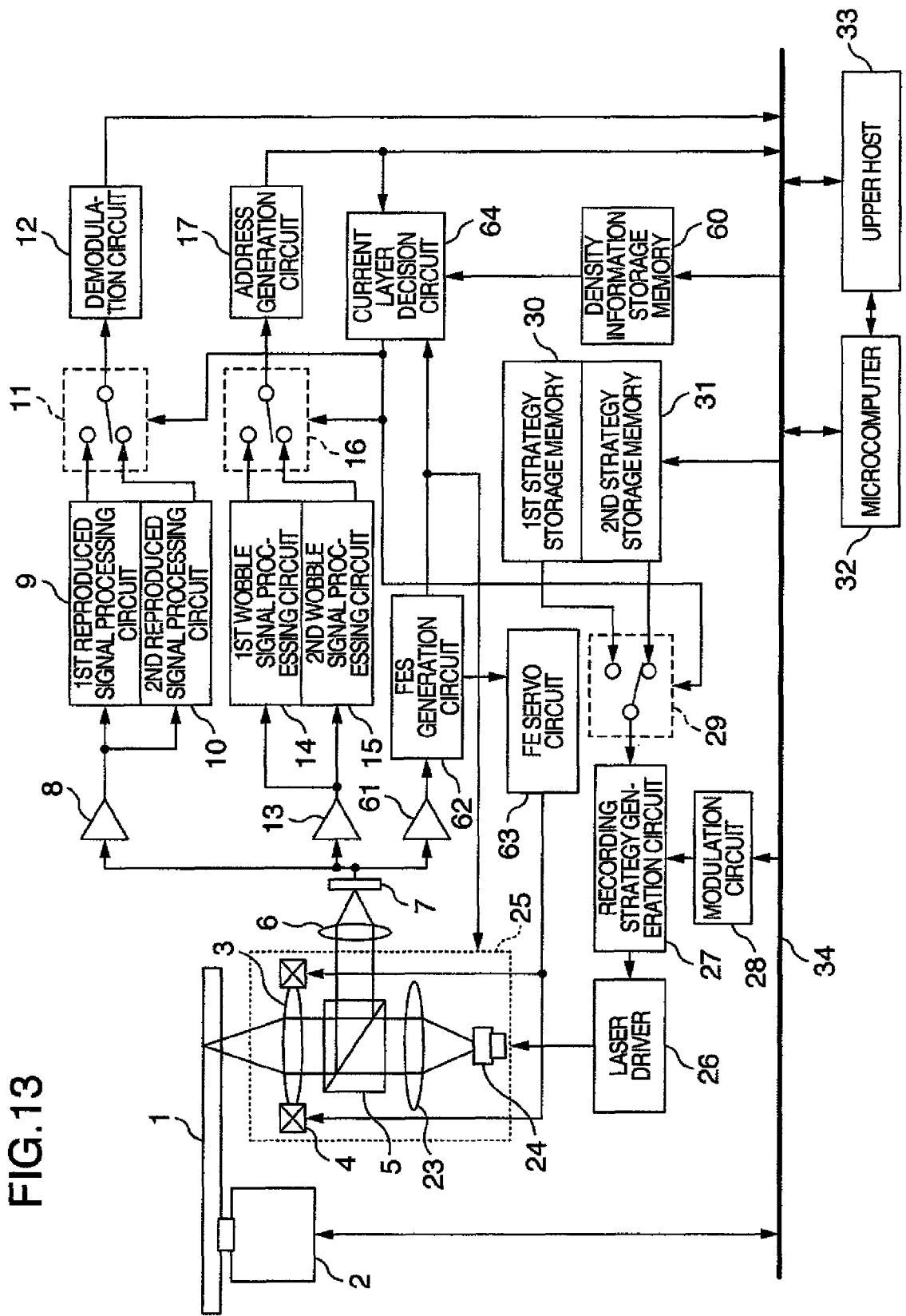
FIG. 13 is a diagram showing a configuration example of an optical disc recording-reproducing apparatus in the third embodiment.

FIG. 13 is a diagram showing a configuration example of an optical disc recording-reproducing apparatus in the present embodiment. In the present embodiment, a density information storage memory 60, a focus error signal (FES) generation circuit 62, a focus error servo circuit 63, and a current layer decision circuit 64 are provided in the configuration shown in FIG. 3. The FES generation circuit 62 generates focusing error signals from respective layers, and the focus error servo circuit 63 conducts pulling focus into the target layer.

The density information of each layer read out from the disc of the type D is stored in the density information storage memory 60, and referred to by the current layer decision circuit 64. The current layer decision circuit 64 is supplied with an FE signal from the FES generation circuit 62 and a reproduction address from the address generation circuit 17 to make a decision as to which layer is the current layer. Furthermore, the current layer decision circuit 64 makes a decision as to the recording density of the current layer (whether the recording density is 25 GB/layer or 33 GB/layer) on the basis of the density information supplied from the density information storage memory 60. On the basis of a result of the decision, the current layer decision circuit 64 conducts the changeover between the first and second reproduced signal processing circuits 9 and 10, the changeover between the first and second wobble signal processing circuits 14 and 15, and the changeover between the first and second strategy storage memories 30 and 31.

FIGS. 14A and 14B are flow charts showing a procedure of recording-reproducing processing in the present embodiment. FIG. 14A shows a process at the time of disc loading, and FIG. 14B shows a process at the time of recording-reproducing processing.

At S501, the disc is inserted into the optical disc apparatus. Here, the disc is a multi-layer disc (type D) including a mixture of a layer having the standard density (25 GB/layer) and a layer having the higher density (33 GB/layer).

At S502, the focus of the optical head is pulled into a specific layer (L0 layer) having the disc management information (data recording density information) recorded therein.

At S503, reproducing conditions for reading out disc management information from the disc are set.

At S504, the optical head is moved to the management information recording area (the PIC area 122) in the disc.

At S505, the disc management information is read out from the management information recording area.

At S506, the disc management information (the data recording densities of respective layers) read out from the management information recording area is stored in the density information storage memory 60.

At S507, a command for ordering information recording or reproducing given by the host is waited for.

Next, the processing proceeds to the recording-reproducing processing.

At S511, the command for information recording or reproducing is received from the host.

At S512, a target address of recording/reproducing is acquired from the received command.

At S513, calculation is conducted to find which layer the target layer is, on the basis of the target address of recording/reproducing.

At S514, information stored in the density information storage memory 60 is referred to, and a decision is made as to the recording density of the target layer.

If the recording density is 25 GB/layer, then the processing proceeds to S515 and the recording-reproducing processing conditions (the reproduced signal processing circuit, the wobble signal processing circuit and the recording strategy) for 25 GB/layer are set.

If the recording density is 33 GB/layer, then the processing proceeds to S516 and the recording-reproducing processing conditions (the reproduced signal processing circuit, the wobble signal processing circuit and the recording strategy) for 33 GB/layer are set.

At S517, the focus of the optical head is pulled into the target layer.

At S518, the address of the arrival position is read out, and the seek end is confirmed.

At S519, recording/reproducing operation is started.

According to the present embodiment, the disc management information (recording densities of respective layers) is recorded in the PIC area in accordance with the unique format, in the multi-layer disc (type D) which differs in data recording density according to the layer as well. Therefore, the reproducing conditions for the management information are determined uniquely, and the recording density can be discriminated easily without errors. In accordance with a recording density in the target layer in the disc, the recording-reproducing operation conformed to the recording density can be executed.

Fourth Embodiment

The present embodiment is also intended for a multi-layer disc including a mixture of a layer having the standard density (25 GB/layer) as the data recording density and a layer having the higher density (33 GB/layer) in the same way as the third embodiment. However, the present embodiment has a configuration in which the disc management information (data recording density information) is recorded in an area which is a part of the data recording area having the standard density (25 GB/layer) (hereafter this disc is referred to as type E) Since in this case the management information is recorded by utilizing the data recording area, it is possible to record information after the manufacture of the disc. For example, the disc manufacturer inspects respective manufactured discs after the manufacture, and makes a decision whether there is a layer which cannot be used. And the manufacturer can cause the disc management information to include a result of the decision together with the recording density information of respective layers and record the resultant disc management information.

Figure 15:
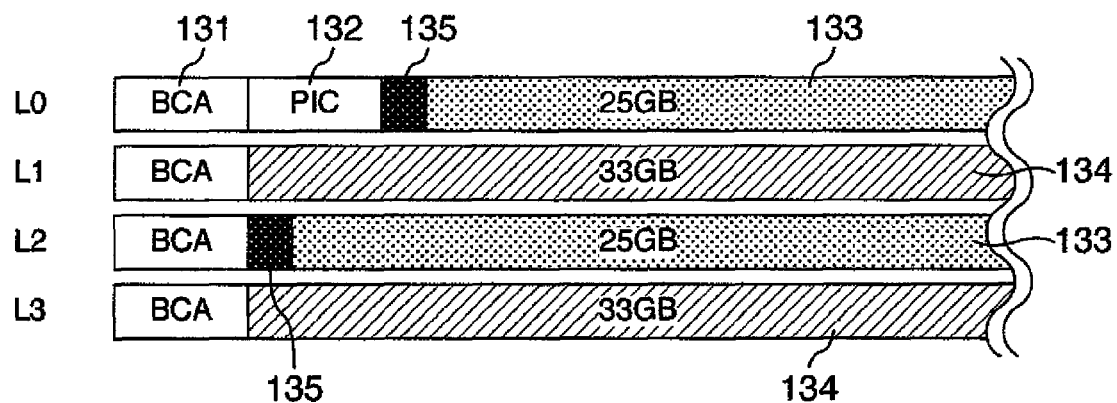
FIG. 15 is a diagram showing an example of a recording layout in an optical disc (type E) in a fourth embodiment.

FIG. 15 is a diagram showing an example of a recording format in the optical disc (type D).

The disc has a four-layer configuration obtained by disposing layers of 25 GB/layer and layers of 33 GB/layer alternately. The layers are denoted by L0, L1, L2 and L3 in the cited order from the disc surface side. In each layer, a BCA area 131, a PIC area 132 (only in the L0 layer), data recording areas 133 and 134 are disposed in the cited order from the inner circumference side. A management information recording area 135 is provided in a part of the data recording area 133 in each of the L0 layer and the L2 layer having the standard density (25 dB/layer) as the recording density. The format of the management information is determined uniquely and even the conventional apparatus can read out the management information certainly by thus recording the management information in the areas having the standard recording density. By the way, if the layer L0 is determined to be always a recording layer having the standard density (25 GB/layer), then the management information can be read out more certainly. Or the management information recording area 135 may be provided in a data recording area in a recording layer having the lowest data recording density.

The management information is recorded in the management information recording area 135 by using embossed pits or rewritable marks. Contents of the management information include information representing whether each layer can be used together with the data recording density of the layer. For example, if the layer is usable, it is indicated by a bit "1". If the layer is not usable, it is indicated by a bit "0".

Figure 16:
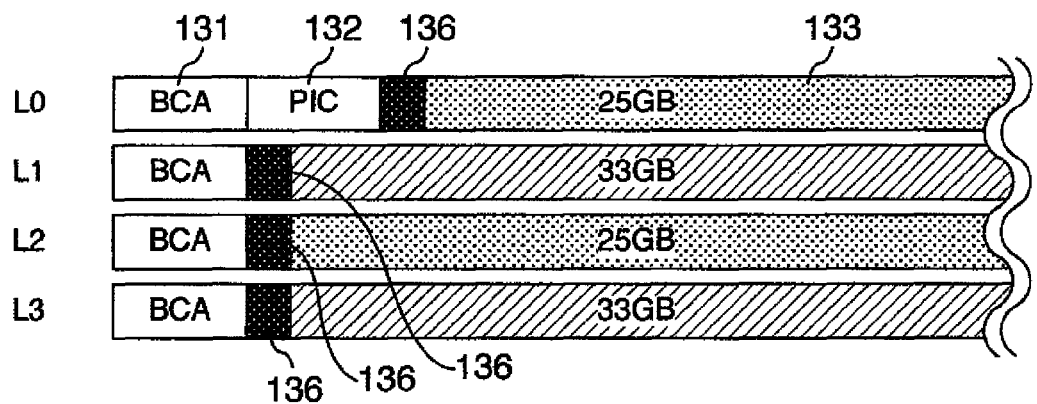
FIG. 16 is a diagram showing another example (type E') of the recording layout of the optical disc in the fourth embodiment.

FIG. 16 is a diagram showing another example of the recording format in the optical disc (type E). The disc is referred to as disc of type E' in order to make a distinction from the disc shown in FIG. 15.

In the optical disc of the type E7, a management information recording area 136 is provided in every layer in order to make it possible to cope with even the case where the apparatus cannot make a decision as to which is the layer having the standard recording density (25 GB/layer). In each area, the management information is recorded in accordance with the format of the standard recording density (25 GB/layer) by using embossed pits or rewritable marks.

At the time of disc loading, the optical disc apparatus reads out the disc management information (the recording density information and use possible/impossible information) and stores the disc management information into the density information storage memory. At the time of recording-reproducing, the recording-reproducing conditions are changed over according to the recording density of each layer. In addition, wasteful operation can be avoided by suspending the recording-reproducing operation with respect to the use impossible layer.

Figure 17:
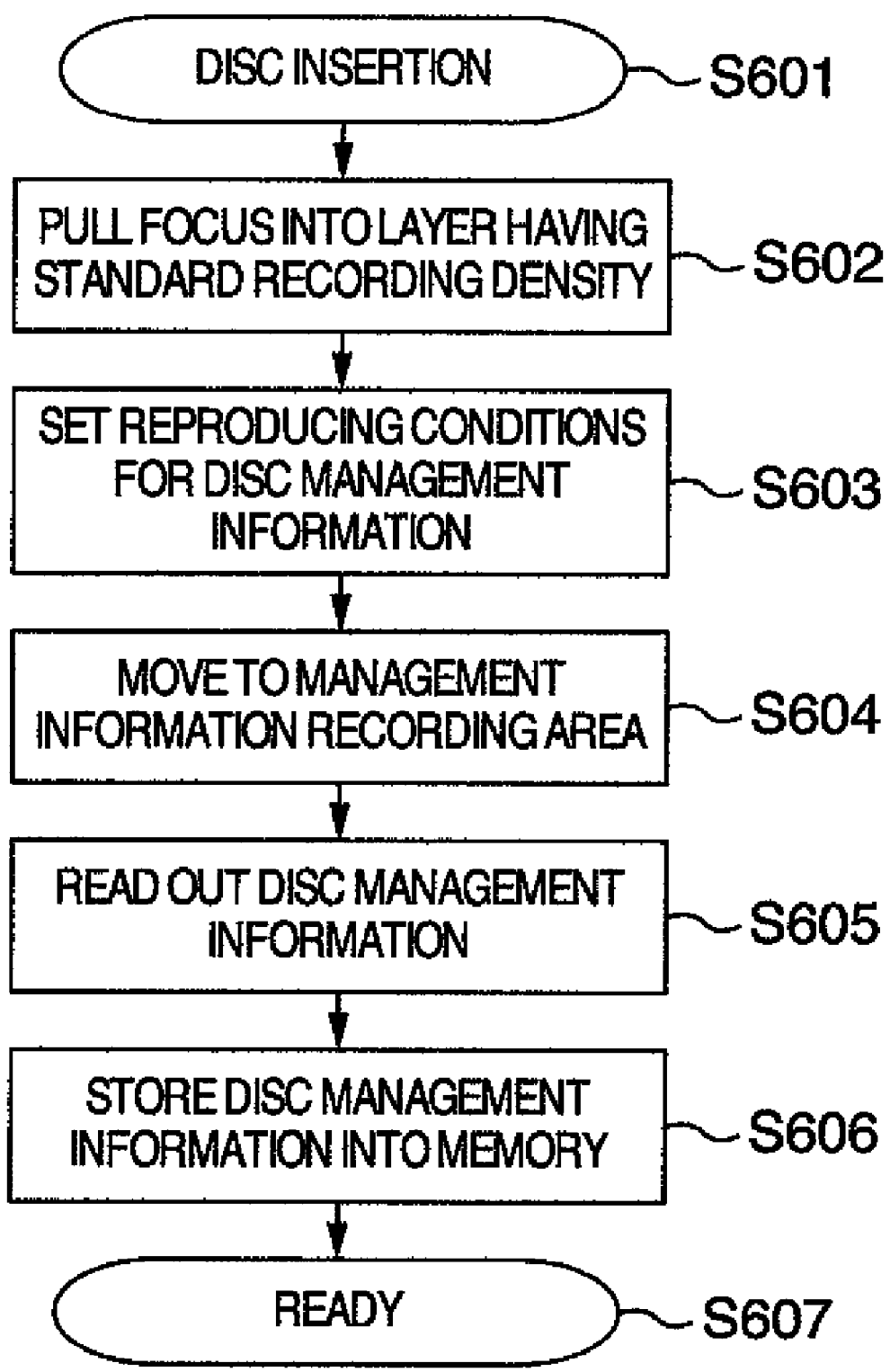
FIG. 17 is a flow chart showing a procedure of recording-reproducing processing in the fourth embodiment.

FIG. 17 is a flow chart showing a procedure of recording-reproducing processing in the present embodiment. A process at the time of the disc loading is shown.

At S601, the disc is inserted into the optical disc apparatus. Here, the disc is a multi-layer disc (type E or type E') including a mixture of a layer having the standard density (25 GB/layer) and a layer having the higher density (33 GB/layer). The management information is recorded in data recording areas having the standard density (25 dB/layer).

At S602, the focus of the optical head is pulled into a layer having the standard density (25 dB/layer). In the case of the disc (type E) shown in FIG. 15, the focus is pulled into the L0 layer or the L2 layer. In the case of the disc (type E') shown in FIG. 16, the focus may be pulled into any layer.

At S603, reproducing conditions for reading out the disc management information from the disc are set. In other words, reproducing conditions for the standard density (25 GB/layer) are set.

At S604, the optical head is moved to the management information recording area 135 or 136.

At S605, the disc management information is read out from the management information recording area.

At S606, the disc management information (recording density information and usable/non-usable layer information) thus read out is stored into the density information storage memory.

At S607, a command for ordering information recording or reproducing given by the host is waited for. Upon receiving the command, the processing proceeds to the recording-reproducing processing.

In the recording-reproducing process, a decision is made as to the recording density of the target layer, and recording-reproducing conditions are changed over according to the recording density. If the target layer is a non-usable layer, then the recording-reproducing operation in that layer is suspended and a report is submitted to the host as occasion demands.

According to the present embodiment, in a multi-layer disc (type E or type E') which differs in data recording density according to the layer, the disc management information (recording densities and usable/non-usable layer information of respective layers) is recorded in an area of a part of a data recording area having the standard density in accordance with the format of the standard density. Therefore, reproducing conditions of the management information are determined uniquely, and the recording density can be discriminated easily without errors. Furthermore, not only the recording-reproducing operation conforming to respective recording densities can be executed in accordance with a recording density in the target layer in the disc, but also a non-usable recording layer can be avoided by referencing the usable/non-usable layer information of respective recording layers.

The embodiments have been described heretofore supposing that there are data recording densities of two kinds: 25 GB/layer and 33 GB/layer. However, the recording density is not restricted to them. Even if there are data recording densities of at least three kinds, the embodiments can be applied in the same way.

Fifth Embodiment

The present embodiment is intended for a multi-layer blu-ray disc (BD) including a disc (hereafter referred to as type A) which has the standard density (25 GB/layer) as the data recording density in every layer and a disc (hereafter referred to as type B) which has the higher standard density (33 GB/layer) as the data recording density in every layer, in the same way as the first embodiment. As for the number of layers, for example, the disc of the type A has a configuration of 25 GB/layer×4 layers and the disc of the type B has a configuration of 33 GB/layer×3 layers. In this way, the capacity of the whole disc is 100 GB in both the disc of the type A and the disc of the type B. The inscription method of the disc management information (data recording density information) in the discs of the type A and the type B is the same as that in the first embodiment shown in FIG. 1, and description thereof will be omitted here.

The present embodiment is intended for the disc of the type A and the disc of the type B. In the present embodiment, the data recording density information in the disc management information described in an area having a recording density which is independent of the data recording density, such as for example, in the BCA area or the PIC area, described with reference to the first embodiment is discriminated, and the reproducing processing and the recording processing are stopped for a disc having a data recording density different from a predetermined data recording density. The present embodiment aims at causing an apparatus to properly recognize a disc having a format to which the apparatus does not correspond in the reproducing operation or the recording operation, causing the apparatus to conduct processing of ejecting the disc and rejecting acceptance of operations other than the eject operation, and thereby preventing a bad influence from occurring in the disc or the apparatus.

A configuration of the recording-reproducing apparatus according to the present embodiment is shown in FIG. 19. It is now supposed that the present recording-reproducing apparatus corresponds to only optical discs having the standard recording density and the present recording-reproducing apparatus does not correspond to the optical discs having the higher recording density.

Figure 18:
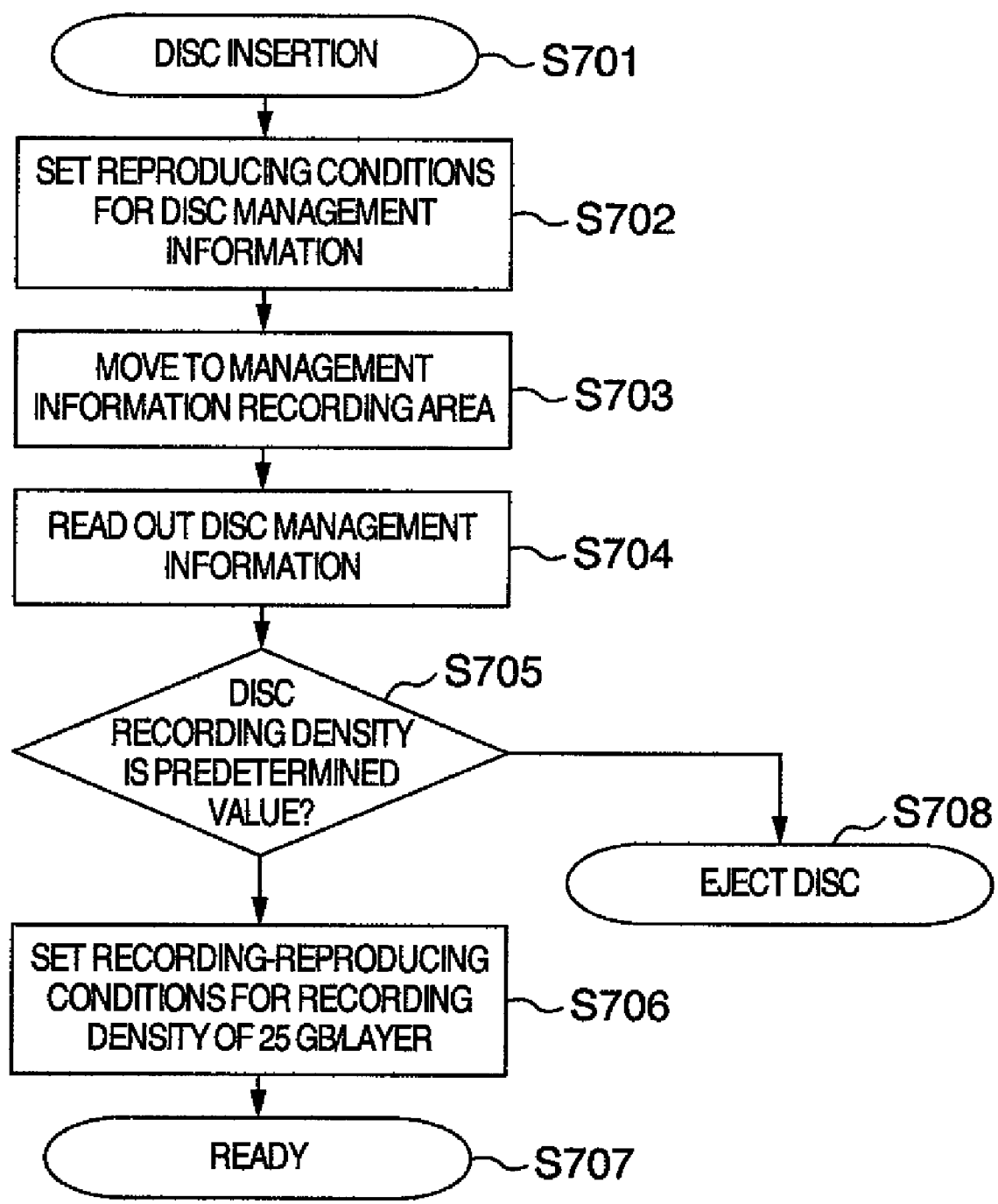
FIG. 18 is a flow chart showing a procedure of processing in a fifth embodiment.

FIG. 18 is a flow chart showing a procedure of processing in the present embodiment. A process at the time of disc loading is shown.

At S701, the disc is inserted into the optical disc apparatus. Here, the disc is a disc of 25 GB/layer (type A) or a disc of 33 GB/layer (type B).

At S702, reproducing conditions for reading out disc management information (data recording density information) from the disc are set. In other words, reproducing conditions conformed to the format in the BCA area 101 or the PIC area 102 which is shown in FIG. 2 are set.

At S703, the optical head is moved to the management information recording area (the BCA area or the PIC area) in the disc.

At S704, the disc management information is read out from the management information recording area.

At S705, a decision is made whether the data recording density of the disc is the predetermined recording density, for example, 25 dB/layer (type A), on the basis of the recording density information read out.

If the recording density of the disc is 25 GB/layer (type A), then the processing proceeds to S706 and the recording-reproducing processing conditions (the reproduced signal processing circuit, the wobble signal processing circuit and the recording strategy) for 25 GB/layer are set in the same way as the first embodiment. At S707, a state (ready) in which a command for ordering information recording or reproducing given by the host is waited for is brought about.

If the recording density of the disc is not 25 GB/layer (type A), then the processing proceeds to S707 and ejection processing of the disc from the optical disc apparatus is conducted.

If the disc decision processing is not conducted unlike the present embodiment and, for example, a disc of the type B is inserted into an optical disc apparatus corresponding to recording and reproducing of only the type A, then the reproducing processing and recording processing become impossible because of the difference in the data recording density. As the worst case, for example, occurrence of an accident such as destruction of recorded data on, for example, the disc of the type B is considerable. On the other hand, in the present embodiment, the occurrence of the accident can be prevented by making a decision as to the disc recording information read out from the recording density area which is independent from the data recording density and conducting the disc ejection processing suitably.

In the first embodiment and the fifth embodiment according to the present invention, the disc having a capacity of 100 GB has been described. As for the number of disc layers, the disc has, for example, 25 GB×4 layers or 33 GB×3 layers. It is a matter of course, however, that similar effects can be obtained according to the present invention even if the disc of the type A has a configuration of 1 or 2 layers, and the disc of the type B has a configuration of 3 or 4 layers, for example.

Heretofore, embodiments of the present invention have been described. According to the present invention, it becomes possible to read out disc management information from an optical disc in which recording is conducted with data recording densities of a plurality of kinds, easily without errors. Furthermore, it becomes possible even for an apparatus corresponding to only the conventional standard recording density discs to conduct disc discrimination processing, resulting in improved user's convenience. In addition, it becomes possible for an apparatus corresponding to optical discs in which recording is conducted with data recording densities of a plurality of kinds to read out the disc management information easily without errors. When an optical disc to which an existing drive apparatus does not correspond in recording/reproducing is inserted into the existing drive apparatus, the existing drive apparatus can discriminate the disc safely and conduct proper processing (for example, stop the function safely and eject the disc) and prevent operation such as erasing data in the disc accidentally or destroying the inside of the drive apparatus.

In connection with the foregoing description, the following items are also disclosed.

1. An optical disc (1) for recording information with a predetermined recording density, the optical disc comprising:
    a data recording area (103; 104) for recording information therein; and
    a management information recording area for recording disc management information which includes information of a data recording density in the data recording area therein,
    wherein the disc management information is recorded in the management information recording area by using a unique format which does not depend upon the data recording density in the data recording area.

2. An optical disc (1) for recording information with a plurality of recording densities, the optical disc comprising:
    a plurality of divided data recording areas (113, 114) disposed in same plane to record information therein with data recording densities which are different from each other; and
    a management information recording area (111, 112) for recording disc management information which includes data recording densities respectively in the data recording areas and information of boundary positions between the recording areas,
    wherein the disc management information is recorded in the management information recording area by using a unique format which does not depend upon the data recording densities respectively in the data recording areas.

3. An optical disc (1) which has a plurality of recording layers (L0-L3) and in which information can be recorded with a plurality of recording densities, the optical disc comprising:
    a plurality of data recording areas (123, 124; 133, 134) in which information is recorded with a data recording density which differs according to the layer; and
    a management information recording area (122; 135; 136) for recording disc management information which includes information of data recording densities respectively in the data recording areas respectively of the recording layers,
    wherein the disc management information is recorded in the management information recording area by using a unique format which does not depend upon the data recording densities respectively in the data recording areas.

4. An optical disc (1) which has a plurality of recording layers (L0-L3) and in which information can be recorded with a plurality of recording densities, the optical disc comprising:
    a plurality of data recording areas (133, 134) in which information is recorded with a data recording density which differs according to the layer; and
    a management information recording area (135) for recording disc management information which includes data recording densities respectively in the data recording areas,
    wherein the management information recording area is disposed in an area which is a part in a data recording area having a standard density as the data recording density and included in the data recording areas, and the disc management information is recorded with a format of the data recording density of the data recording area.

5. The optical disc according to item 3, wherein the management information recording area (122) is disposed so as to be adjacent to a data recording area having a standard density as the data recording density and included in the data recording areas.

6. The optical disc according to any one of items 1 to 3, wherein a BCA (Burst Cutting Area) area or a PIC (Permanent Information & Control data) area is used as the management information recording area.

7. The optical disc according to item 4, wherein information which indicates whether each recording layer is usable or not is also recorded in the management information recording area as the disc management information.

8. An optical disc recording apparatus for recording or reproducing information into or from data recording areas (103; 104) of an optical disc (1), disc management information including information of data recording densities of the data recording areas being recorded in a management information recording area (101, 102) of the optical disc by using a unique format, the optical disc recording apparatus comprising:
    a recording density decision circuit (35) for making a decision as to a data recording density on the basis of the disc management information; and
    a recording-reproducing setting circuit (11, 16, 29),
    wherein recording-reproducing processing conditions are selected and set in the recording-reproducing setting circuit in accordance with the data recording density obtained by the decision made by the recording density decision circuit.

9. An optical disc reproducing apparatus for reproducing information from data recording areas (103; 104) of an optical disc (1), disc management information including information of data recording densities of the data recording areas being recorded in a management information recording area (101, 102) of the optical disc by using a unique format, the optical disc reproducing apparatus comprising:
    a recording density decision circuit (35) for making a decision as to a data recording density in a target data recording area on the basis of the disc management information; and
    a recording-reproducing setting circuit (11, 16, 29),
    wherein reproducing processing conditions are selected and set in the recording-reproducing setting circuit in accordance with the data recording density obtained by the decision made by the recording density decision circuit.

10. The optical disc recording apparatus according to item 8, wherein
    the optical disc includes a plurality of divided data recording areas (113, 114) disposed in same plane to record information therein with data recording densities which are different from each other,
    the optical disc recording apparatus comprises an address decision circuit (51) which makes a decision as to a data recording density by referring to information regarding data recording densities and a boundary position detected from the disc management information, and
    when the data recording density is changed over as a result of the decision made by the address decision circuit, recording-reproducing processing conditions are selected and set in a recording/reproducing setting circuit (11, 16, 29) in accordance with the data recording density.

11. The optical disc reproducing apparatus according to item 9, wherein
    the optical disc includes a plurality of divided data recording areas (113, 114) disposed in same plane to record information therein with data recording densities which are different from each other, the optical disc reproducing apparatus comprises an address decision circuit (51) which makes a decision as to a data recording density by referring to information regarding data recording densities and a boundary position detected from the disc management information, and when the data recording density is changed over as a result of the decision made by the address decision circuit, reproducing processing conditions are selected and set in a recording-reproducing setting circuit (11, 16, 29) in accordance with the data recording density.

12. The optical disc recording apparatus according to item 8, wherein the optical disc includes a plurality of recording layers (L0-L3), and a plurality of data recording areas (123, 124; 133, 134) in which information is recorded with a data recording density which differs according to the layer;

the optical disc recording apparatus comprises a layer decision circuit (64) which makes a decision as to a data recording density by referring to data recording density information detected from the disc management information, and when the data recording density is changed over as a result of the decision made by the layer decision circuit, recording-reproducing processing conditions are selected and set in a recording-reproducing setting circuit (11, 16, 29) in accordance with the data recording density.

13. The optical disc reproducing apparatus according to item 9, wherein the optical disc includes a plurality of recording layers (L0-L3), and a plurality of data recording areas (133, 134) in which information is recorded with a data recording density which differs according to the layer;

the optical reproducing apparatus comprises a layer decision circuit (64) which makes a decision as to a data recording density by referring to data recording density information detected from the disc management information, and when the data recording density is changed over as a result of the decision made by the layer decision circuit, reproducing processing conditions are selected and set in a recording-reproducing setting circuit (11, 16, 29) in accordance with the data recording density.

14. The optical disc recording apparatus according to any one of items 8, 10 and 12, comprising:

at least one of reproduced signal processing circuits (9, 10), wobble signal processing circuits (14, 15), and recording strategy generation circuits (30 and 31), wherein processing conditions of the respective circuits are selected according to the data recording density and set in the recording-reproducing setting circuit (11, 16, 29).

15. The optical disc recording apparatus according to any one of items 9, 11 and 13, comprising:

at least one of reproduced signal processing circuits (9, 10), wobble signal processing circuits (14, 15), and recording strategy generation circuits (30 and 31), wherein processing conditions of the respective circuits are selected according to the data recording density and set in the recording-reproducing setting circuit (11, 16, 29).

16. An information recording-reproducing method for recording or reproducing information into or from data recording areas (103; 104) of an optical disc (1), disc management information including information of data recording densities of the data recording areas being recorded in a management information recording area (101, 102) of the optical disc by using a unique format, the information recording-reproducing method comprising the steps of:

setting (S302) reproducing conditions for reproducing the disc management information in accordance with the unique format;

reading out (S304) the disc management information from the management information recording area in the optical disc;

making (S305) a decision as to a data recording density on the basis of the disc management information read out;

selecting and setting (S306, S307) recording-reproducing processing conditions according to the data recording density obtained as a result of the decision; and recording or reproducing information under the set recording-reproducing processing conditions.

17. An information reproducing method for reproducing information from data recording areas (103; 104) of an optical disc (1), disc management information including information of data recording densities of the data recording areas being recorded in a management information recording area (101, 102) of the optical disc by using a unique format, the information reproducing method comprising the steps of:

setting (S302) reproducing conditions for reproducing the disc management information in accordance with the unique format;

reading out (S304) the disc management information from the management information recording area in the optical disc;

making (S305) a decision as to a data recording density on the basis of the disc management information read out;

selecting and setting (S306, S307) reproducing processing conditions according to the data recording density obtained as a result of the decision; and reproducing information under the set reproducing processing conditions.

18. The information recording-reproducing method according to item 16, wherein the optical disc has a plurality of divided data recording areas (113, 114) disposed in same plane, in which data can be recorded with data recording densities which are different from each other, the information recording-reproducing method comprises the steps of:

referring (S412) to a data recording density on the basis of the disc management information; and selecting and setting (S413) recording-reproducing processing conditions according to the data recording density in a data recording area.

19. The information reproducing method according to item 17, wherein the optical disc has a plurality of divided data recording areas (113, 114) disposed in same plane, in which data can be recorded with data recording densities which are different from each other, the information reproducing method comprises the steps of:

referring (S412) to a data recording density on the basis of the disc management information; and selecting and setting (S413) reproducing processing conditions according to the data recording density in a data recording area.

20. The information recording-reproducing method according to item 16, wherein the optical disc has a plurality of recording layers (L0-L3) and has a plurality of data recording areas (123, 124; 133, 134) in which information can be recorded with a data recording density which differs according to the layer, the information recording-reproducing method comprises the steps of:

referring (S512, S513, S514) to a data recording density on the basis of the disc management information; and selecting and setting (S515, S516) recording-reproducing processing conditions according to the data recording density in a data recording area.

21. The information reproducing method according to item 17, wherein the optical disc has a plurality of recording layers (L0-L3) and has a plurality of data recording areas (123, 124; 133, 134) in which information can be recorded with a data recording density which differs according to the layer, the information reproducing method comprises the steps of:

referring (S512, S513, S514) to a data recording density on the basis of the disc management information; and selecting and setting (S515, S516) reproducing processing conditions according to the data recording density in a data recording area.

22. An optical disc reproducing apparatus for reproducing information from data recording areas (103; 104) of an optical disc (1), wherein disc management information including information of data recording densities of the data recording areas is recorded in a management information recording area (101, 102) of the optical disc by using a unique format, the optical disc reproducing apparatus comprises a recording density decision circuit (35) to make a decision as to a data recording density in a target data recording area on the basis of the disc management information, and reproducing processing of the optical disc is stopped (S708) depending upon the data recording density obtained as a result of the decision made by the recording density decision circuit.

23. An optical disc recording apparatus for recording or reproducing information into or from data recording areas (103; 104) of an optical disc (1), wherein disc management information including information of data recording densities of the data recording areas is recorded in a management information recording area (101, 102) of the optical disc by using a unique format, the optical disc reproducing apparatus comprises a recording density decision circuit (35) to make a decision as to a data recording density in a target data recording area on the basis of the disc management information, and recording processing of the optical disc is stopped (S708) depending upon the data recording density obtained as a result of the decision made by the recording density decision circuit.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An information recording-reproducing method for recording or reproducing information into or from data recording areas of first and second optical discs, the first and second optical discs being subject to recording and reproducing with a laser of same wavelength, the data recording areas of first and second optical discs having different recording densities, respectively, disc management information including information of data recording densities of the data recording areas being recorded in a management information recording area of the first and second optical discs by using a unique format, the information recording-reproducing method comprising:

setting reproducing conditions for reproducing the disc management information in accordance with the unique format;

reading out the disc management information from the management information recording area in the optical disc;

making a decision as to a data recording density on the basis of the disc management information read out;

selecting and setting recording-reproducing processing conditions for the first or second optical disc according to the data recording density obtained as a result of the decision, the recording-reproducing processing conditions for the first and second optical disc are different from each other; and recording or reproducing information under the set recording-reproducing processing conditions.

2. An information reproducing method for reproducing information from data recording areas of first and second optical discs, the first and second optical discs being subject to recording and reproducing with a laser of same wavelength, the data recording areas of first and second optical discs having different recording densities, respectively, disc management information including information of data recording densities of the data recording areas being recorded in a management information recording area of the first and second optical discs by using a unique format, the information reproducing method comprising:

setting reproducing conditions for reproducing the disc management information in accordance with the unique format;

reading out the disc management information from the management information recording area in the optical disc;

making a decision as to a data recording density on the basis of the disc management information read out;

selecting and setting reproducing processing conditions for the first or second optical disc according to the data recording density obtained as a result of the decision, the recording-reproducing processing conditions for the first and second optical disc are different from each other; and reproducing information under the set reproducing processing conditions.

3. An information reproducing method for reproducing information from data recording areas of first and second optical discs, the first and second optical discs being subject to recording and reproducing with a laser of same wavelength, the data recording areas of first and second optical discs having different recording densities, respectively, disc management information including information of data recording densities of the data recording areas being recorded in a management information recording area of the first and second optical discs by using a unique format, the information reproducing method comprising:

setting reproducing conditions for reproducing the disc management information in accordance with the unique format;

reading out the disc management information from the management information recording area in the optical discs;

making a decision as to a data recording density on the basis of the disc management information read out; and stopping information reproducing of information from the first or second optical disc depending upon the data recording density obtained as a result of the decision, the recording-reproducing processing conditions for the first and second optical disc are different from each other.

4. An information recording method for recording information into data recording areas of first and second optical discs, the first and second optical discs being subject to recording and reproducing with a laser of same wavelength, the data recording areas of first and second optical discs having different recording densities, respectively, disc management information including information of data recording densities of the data recording areas being recorded in a management information recording area of the first and second optical discs by using a unique format, the information recording method comprising:

setting reproducing conditions for reproducing the disc management information in accordance with the unique format;

reading out the disc management information from the management information recording area in the optical discs;

making a decision as to a data recording density on the basis of the disc management information read out; and stopping information recording of information onto the first or second optical disc depending upon the data recording density obtained as a result of the decision, the recording-reproducing processing conditions for the first and second optical disc are different from each other.

5. The information recording-reproducing method according to claim 1, wherein the first and second discs are same with respect to signal modulation method.

6. The information reproducing method according to claim 2, wherein the first and second discs are same with respect to signal modulation method.

7. The information reproducing method according to claim 3, wherein the first and second discs are same with respect to signal modulation method.

8. An information recording method according to claim 4, wherein the first and second discs are same with respect to signal modulation method.

9. An information recording-reproducing method for recording or reproducing information into or from data recording areas of first and second optical discs, the first and second discs are same with respect to signal modulation method, the data recording areas of first and second optical discs having different recording densities, respectively, disc management information including information of data recording densities of the data recording area being recorded in a management information recording area of the first and second optical discs by using a unique recording density format which is different from recording densities format of the first and second optical disks, the information recording-reproducing method comprising:

setting reproducing conditions for reproducing the disc management information in accordance with the unique recording density format;

reading out the disc management information from the management information recording area in the optical discs;

making a decision as to a data recording density on the basis of the disc management information read out;

selecting and setting recording-reproducing processing conditions for the first or second optical disc according to the data recording density obtained as a result of the decision, the recording-reproducing processing conditions for the first and second optical disc are different from each other; and recording or reproducing information under the set recording-reproducing processing conditions.

10. An information reproducing method for reproducing information from data recording areas of first and second optical discs, the first and second discs being same with respect to signal modulation method, the data recording areas of first and second optical discs having different recording densities, respectively, disc management information including information of data recording densities of the data recording areas being recorded in a management information recording area of the first and second optical discs by using a unique recording density format which is different from recording densities format of the first and second optical disks, the information reproducing method comprising:

setting reproducing conditions for reproducing the disc management information in accordance with the unique recording density format;

reading out the disc management information from the management information recording area in the optical discs;

making a decision as to a data recording density on the basis of the disc management information read out;

selecting and setting reproducing processing conditions for the first or second optical disc according to the data recording density decided as a result of the decision, the recording-reproducing processing conditions for the first and second optical disc are different from each other; and reproducing information under the set reproducing processing conditions.

11. An information reproducing method for reproducing information from data recording areas of first and second optical discs, the first and second discs being same with respect to signal modulation method, the data recording areas of first and second optical discs having different recording densities, respectively, disc management information including information of data recording densities of the data recording areas being recorded in a management information recording areas of the first and second optical discs by using a unique recording density format which is different from recording densities format of the first and second optical disks, the information reproducing method comprising:

setting reproducing conditions for reproducing the disc management information in accordance with the unique recording density format;

reading out the disc management information from the management information recording area in the optical discs;

making a decision as to a data recording density on the basis of the disc management information read out; and stopping reproducing of information from the first or second optical disc depending upon the data recording density obtained as a result of the decision, the recording-reproducing processing conditions for the first and second optical disc are different from each other.

12. An information recording method for recording information into data recording areas of first and second optical discs,
- the first and second discs being same with respect to signal modulation method,
- the data recording areas of first and second optical discs having different recording densities, respectively,
- disc management information including information of data recording densities of the data recording areas being recorded in a management information recording area of the first and second optical discs by using a unique recording density format which is different from recording densities format of the first and second optical disks, the information recording method comprising:
- setting reproducing conditions for reproducing the disc management information in accordance with the unique recording density format;
- reading out the disc management information from the management information recording area in the optical discs;
- making a decision as to a data recording density on the basis of the disc management information read out; and
- stopping recording of information onto the first or second optical disc depending upon the data recording density obtained as a result of the decision, the recording-reproducing processing conditions for the first and second optical disc are different from each other.

13. The information recording-reproducing method according to claim 1, wherein the first and second optical discs each have disc layers in a single multi-layered optical disk.

14. The information reproducing method according to claim 2, wherein the first and second optical discs each have disc layers in a single multi-layered optical disk.

15. The information reproducing method according to claim 3, wherein the first and second optical discs each have disc layers in a single multi-layered optical disk.

16. An information recording method according to claim 4, wherein the first and second optical discs each have disc layers in a single multi-layered optical disk.

17. The information recording-reproducing method according to claim 9, wherein the first and second optical discs each have disc layers in a single multi-layered optical disk.

18. The information reproducing method according to claim 10, wherein the first and second optical discs each have disc layers in a single multi-layered optical disk.

19. The information reproducing method according to claim 11, wherein the first and second optical discs each have disc layers in a single multi-layered optical disk.

20. An information recording method according to claim 12, wherein the first and second optical discs each have disc layers in a single multi-layered optical disk.

* * * * *